(12) United States Patent
Kato et al.

(10) Patent No.: US 6,185,168 B1
(45) Date of Patent: Feb. 6, 2001

(54) SUPER-RESOLUTION OPTICAL HEAD APPARATUS

(75) Inventors: Makoto Kato, Hyogo; Kenichi Kasazumi, Osaka; Shin-ichi Kadowaki, Osaka; Hiroaki Yamamoto, Osaka; Kazuhisa Yamamoto, Osaka, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/465,773

(22) Filed: Dec. 17, 1999

Related U.S. Application Data

(62) Division of application No. 08/888,529, filed on Jul. 7, 1997, now Pat. No. 6,115,345, which is a continuation of application No. 08/513,394, filed on Aug. 10, 1995, now abandoned.

(30) Foreign Application Priority Data

Mar. 27, 1995 (JP) .................................... 7-067627

(51) Int. Cl.[7] .................................... G11B 7/09

(52) U.S. Cl. .................. 369/44.23; 369/110; 369/112

(58) Field of Search .................. 369/44.23, 112, 369/110, 44.37, 44.41, 13

(56) References Cited

U.S. PATENT DOCUMENTS

| | | | |
|---|---|---|---|
| 5,208,801 | 5/1993 | Finegan | 369/100 |
| 5,311,495 | 5/1994 | Ando | 369/110 |
| 5,329,517 | 7/1994 | Yamaguchi et al. | 369/118 |
| 5,519,685 | 5/1996 | Kato et al. | 369/110 |
| 5,590,110 | 12/1996 | Sato | 369/44.24 |
| 5,625,613 | 4/1997 | Kato et al. | 369/112 |
| 5,648,951 * | 7/1997 | Kato et al. | 369/112 |

FOREIGN PATENT DOCUMENTS

| | | |
|---|---|---|
| 0 106 673 A2 | 4/1984 | (EP) . |
| 0 494 767 A2 | 7/1992 | (EP) . |
| 0 597 202 | 5/1994 | (EP) . |

OTHER PUBLICATIONS

M. Kato et al., "Recent Advances in Optical Pickup Head with Holographic Optical Elements", Proc. of the International Society for Optical Engineering, Mar., 1991, vol. 1507, pp. 11–15.

H. Ando et al., "Optical Head with Annular Phase–Shifting Apodizer", Japan Applied Physics, Nov., 1993, vol. 32 pp. 5269–5276.

Y. Yamanaka et al., "High Density Optical Recording by Superresolution", Proc. of Int. Sump. on Optical Memory, 1989, vol. 28, Supp. 28–3, pp. 197–200.

R.Katayama et al., "Multi–Beam Optical Disk Drive for High Data Transfer Rate Systems", Proc. of Int. Symp. on Optical Memory, 1991, pp. 268–272.

* cited by examiner

Primary Examiner—Thang V. Tran
(74) Attorney, Agent, or Firm—McDermott, Will & Emery

(57) ABSTRACT

A linearly polarized light beam emitted from a coherent light source reaches a polarizing phase plate and is thereby divided into a primary beam and a subsidiary beam having a polarized light component perpendicular to the polarized light component of the primary beam and a double-humped pattern, in which the center position coincides with the center position of the primary beam and the principal portion is equal in size to the principal portion of the primary beam. The primary beam and the subsidiary beam are focused onto an information storage surface of an optical disk and reflected therefrom, so that they are separated again through polarization separation and individually detected by first to third optical detectors. The output signals from the first to third optical detectors are calculated by a differential calculator and outputted therefrom.

6 Claims, 20 Drawing Sheets

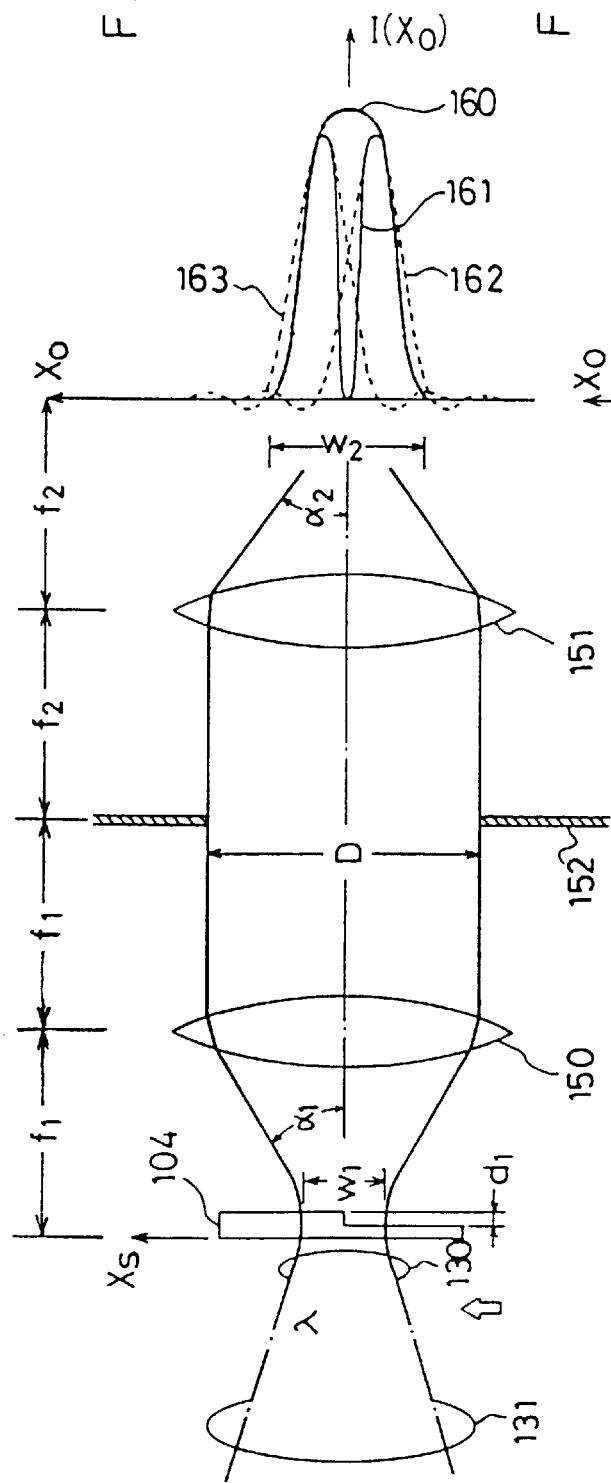
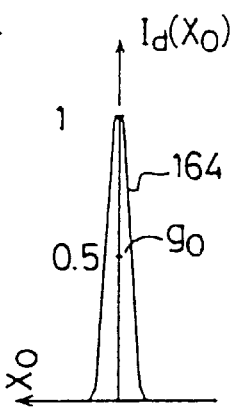
FIG.2(a)
FIG.2(b)

SUPER-RESOLUTION OPTICAL HEAD APPARATUS

This is a divisional application of Ser. No. 08/888,529, Jul. 7, 1997, now U.S. Pat. No. 6,115,345, which is a filewrapper continuation of Ser. No. 08/513,394, filed Aug. 10, 1995, now abandoned.

BACKGROUND OF THE INVENTION

The present invention relates to a super-resolution optical head apparatus for optically reading information from an information storage surface with a light beam focused thereon. More particularly, it relates to a super-resolution optical head apparatus applicable to an optical head apparatus for optical disks, a bar-code scanner, and an image scanner.

The super-resolution optical head apparatus mentioned above comprises: a focusing means for focusing a coherent beam onto a fine spot on the information storage surface; and a photoelectric converting means for detecting the intensity of the beam reflected from the information storage surface. The above super-resolution optical head apparatus is equipped with various arrangements that have been devised to obtain a fine focal spot equivalent to or smaller than the diffraction limited.

FIG. 20(a) is a schematic view showing the structure of a conventional image-forming optical system using an annular diaphragm, which is well-known as a super-resolution optical system, as a double diffraction optical system. Such a super-resolution optical system using the annular diaphragm or a phase plate has found applications in optical head apparatus, which are reported in the following documents:

(1) "High Density Optical Recording by Super Resolution," Y. Yamada, Y. Hirose and K. Kubota, Proc. Int. Symp. on Optical Memory. 1989, Jap. J. of Appl. Phys., Vol. 28 (1989) supplement 28-3, pp. 197–200.

(2) "Optical Head with Annular Phase-Shifting Apodizer," Hideo Ando, Tsuneshi Yokota and Koki Tanoue, Jap. J. Appl. Phys., Vol. 32 (1993) pp.5269–5276, pt. 1, NO. 11B.

As shown in FIG. 20, a coherent beam emitted from a coherent light source 50 is turned into parallel-beams upon passing through a collimator lens (a first Fourier transform lens) 51. The resulting parallel beams are then allowed to pass through apertures 52a and 52b (slits in one dimension) of an annular diaphragm 52 and converged by an objective lens (a second Fourier transform lens) 53 so as to form an image, thereby providing a super-resolution spot having the intensity distribution I(X), which is shown in FIG. 20 as the power spectrum of the transmittance of the foregoing annular diaphragm 52.

The above document (1) discloses an optical head which forms such a super-resolution spot in one dimension and uses only the main lobe thereof obtained by means of knife-edges constituting a slit. The above document (2) discloses a system which uses a plurality of phase distributions and a specified amplitude distribution as the annular diaphragm in order to form a super-resolution spot in two dimensions, thereby suppressing the side lobes on both sides of the main lobe shown in FIG. 20(b). In the system, the conditions for designing the annular diaphragm are optimized to suppress the side lobes.

However, the system for suppressing the side lobes by means of the annular diaphragm is not free from a reduction in intensity of the focused beam. In the case where the peak intensity of the focused beam is reduced to about 50% to 15%, e.g., if the half bandwidth of the main lobe is reduced to 85% of the diffraction limited, the intensity of the side lobe becomes about 7% of the peak intensity of the main lobe.

As described above, if the aperture through which light is incident upon the objective lens is formed into a slit or an annularity, there can be achieved super resolution smaller than the diffraction limited with the side lobes suppressed to a certain extent. On the other hand, there arise the following problems: (1) since the quantity of light reaching an image forming plane is reduced significantly, the quantity of light in the main lobe is also reduced disadvantageously; (2) moreover, since the aperture for shielding the side lobes is provided a higher accuracy is required in adjusting the optical path, while the reliability of the apparatus is lowered because the components of the optical system deteriorate with the passage of time or for other reasons; and (3) furthermore, the half bandwidth of the beam is reduced to about 90% to 80% at most.

SUMMARY OF THE INVENTION

In view of the foregoing, an object of the present invention is to provide a super-resolution optical head apparatus with extremely high performance wherein a simple optical system prevents a significant reduction in the quantity of light and the beam width of the diffraction limited can be reduced to about 70%.

To attain the above object, in a first super-resolution optical head apparatus of the present invention, a primary beam having a peak intensity in the center thereof and a subsidiary beam having peak intensities at least on both sides of the center thereof, both having equal-sized principal portions, are incoherently superimposed upon each other and focused onto an information storage surface and the light beam reflected from the information storage surface is separated into the primary beam and the subsidiary beam such that the light intensities thereof are differentially detected, thereby implementing a super-resolution optical system. Here it mean by "super resolution that the spatial frequency response of optical scanning system is increased. It will become apparent that the cross-talk cancelling effect of the present invention is also greatly appreciated.

The first super-resolution optical head apparatus comprises: a first coherent light source for emitting a first coherent beam serving as a primary beam; a second coherent light source for emitting a second coherent beam which has either a plane of polarization perpendicular (orthogonal) to a plane of polarization of the first coherent beam or a wavelength different from a wavelength of the first coherent beam; a phase plate for receiving the second coherent beam and emitting a subsidiary beam which has an intensity distribution in which peak values are placed at least on both sides of a center thereof on a plane perpendicular to an optical axis and a principal portion thereof is equal in size to a principal portion of the primary beam; a focusing means for superimposing the primary beam emitted from the first coherent light source and the subsidiary beam emitted from the phase plate upon each other and focusing them onto an information storage surface having an optical information storage carrier; a control means for controlling the focusing means such that a light beam composed of the primary beam and the subsidiary beam being superimposed upon each other performs focusing and tracking with respect to the optical information storage carrier of the information storage surface; a light separating means for receiving the light beam reflected from the information storage surface, separating the light beam into the primary beam and the subsidiary beam through polarization separation or wavelength separation, and emitting them; an optical detecting means for individually detecting an intensity of the primary beam and an intensity of the subsidiary beam and outputting a light intensity signal; and a calculating means for calculating, based on the light intensity signal outputted from the optical detecting means, a super-resolution scanning signal and outputting it.

With the first super-resolution optical-head apparatus, the primary beam has the normal Airy-disc pattern or has a peak intensity on the optical axis. On the focal plane, the principal portion of the subsidiary beam connected with a dipped profile or a trough has a beam size equal to about 70% of that of the primary beam. The subsidiary beam has a principal portion equal, or almost equal, in size to that of the primary beam and has a double-humped intensity distribution with peak values placed at least on both sides of the center thereof. The subsidiary beam having the double-humped intensity distribution can easily be generated by means of a stepped phase plate which imparts a relative phase difference varying from 0 to $\pi$ with the wavelength of the light transmitted thereby. By irradiating the phase plate with the subsidiary beam having substantially the same intensity distribution as the primary beam, substantially the same intensity distribution as provided in the peripheral portion of the primary beam can be provided in the peripheral portion of the double-humped beam. Such waveform shaping for a beam can be performed by optimizing the diameter of an aperture through which the primary and subsidiary beams pass. Slight difference in the sizes of the respective principal portions may slightly deteriorate the cross-talk cancelling effect of the present invention, which, however is a matter of designing the apparatus.

The primary beam and subsidiary beam are incoherently superimposed upon each other and focused onto the information storage surface. The plane to be scanned, which is the information storage surface, is scanned with a light beam obtained by incoherently superimposing the primary beam and subsidiary beam upon each other, while the primary beam forms a beam profile having the Airy-disc pattern or having a peak intensity in the center thereof. The light beam obtained by superimposing the primary beam and subsidiary beam on the information storage surface is reflected by the information storage surface and then separated into the primary and subsidiary beams again by utilizing the fact that they have planes of polarization perpendicular to each other or wavelengths different from each other, so that the intensities thereof are detected individually. The detected light intensities are differentially calculated, so that an output signal equivalently scanned as a difference in intensity distribution between the primary beam and the subsidiary beam is obtained. Therefore, a super-resolution optical signal can surely be obtained with ease.

Consequently, with the first super-resolution optical head apparatus, the resolving power of the optical system surpasses the diffraction limited of the objective lens in use, thereby equivalently implementing about 70% of the beam width.

A second super-resolution optical head apparatus according to the present invention implements a super-resolution optical system by using a holographic optical element in place of the phase plate of the first super-resolution optical head apparatus.

The second super-resolution optical head apparatus according to the present invention comprises: a first coherent light source for emitting a first coherent beam serving as a primary beam; a second coherent light source for emitting a second coherent beam which has either a plane of polarization perpendicular to a plane of polarization of the first coherent beam or a wavelength different from a wavelength of the first coherent beam: a holographic optical element for receiving the second coherent beam and emitting a subsidiary beam which has an intensity distribution in which peak values are placed at least on both sides of a center thereof on a plane perpendicular to an optical axis and a principal portion thereof is equal in size to a principal portion of the primary beam; a focusing means for superimposing the primary beam emitted from the first coherent light source and the subsidiary beam emitted from the holographic optical element upon each other and focusing them onto an information storage surface having an optical information storage carrier; a control means for controlling the focusing means such that a light beam composed of the primary beam and the subsidiary beam being superimposed upon each other performs focusing and tracking with respect to the optical information storage carrier of the information storage surface; a light separating means for receiving the light beam reflected from the information storage surface, separating the light beam into the primary beam and the subsidiary beam through polarization separation or wavelength separation, and emitting them; an optical detecting means for individually detecting an intensity of the primary beam and an intensity of the subsidiary beam and outputting a light intensity signal; and a calculating means for calculating, based on the light intensity signal outputted from the optical detecting means, a super-resolution scanning signal and outputting it.

In the second super-resolution optical head apparatus, the primary beam has the normal Airy-disc pattern or has a peak intensity on the optical axis. On the information storage surface, the principal portion of the subsidiary beam reproduced from the holographic optical element has a beam size equal to the half bandwidth of the primary beam. Peak intensities are formed at least on both sides of the center of the subsidiary beam. The primary beam and subsidiary beam are incoherently superimposed upon each other and focused onto the information storage surface. The light beam obtained by superimposing the primary beam and subsidiary beam on the information storage surface is reflected thereby and separated into the primary beam and subsidiary beam through polarization or wavelength separation so that the intensities thereof are detected individually. The detected light intensities are differentially calculated, so that an output signal equivalently scanned as a difference in intensity distribution between the primary beam and the subsidiary beam is obtained. Consequently, a super-resolution optical signal can surely be obtained with ease.

With the second super-resolution optical head apparatus, the subsidiary beam can be generated by the holographic optical element functioning as a phase plate. Even though complicated procedures are required in the process of fabricating a phase plate, the apparatus needs the provision of only one phase plate, so that the holographic optical elements can be manufactured on an industrial scale and used. Alternatively, it is also possible to use a technique of computer-generated hologram whereby a phase plate is designed on a computer without actually being fabricated, so that flexibility in designing and fabrication is enhanced.

In the first or second super-resolution optical head apparatus, the phase plate is preferably divided into N (N is an integer equal to or more than 2) regions around a center thereof, the N regions imparting a relative phase difference advancing stepwise in the sequence of 0, $2\pi/N$, $(2\pi/N)\times 2$, $(2\pi/N)\times 3$, . . . , and $(2\pi/N)\cdot(N-1)$ to the second coherent beam emitted from the second coherent light source, and preferably emits, as the subsidiary beam, the second coherent beam passing through the N regions.

Thus, by using the polarizing phase plate symmetrical with respect to the axis, the light beam obtained by superimposing the primary beam and the subsidiary beam, which has peek intensities around the center thereof and which is coaxial with the primary beam, is focused on the information storage surface. The light beam reflected from the information storage surface is subjected to polarization separation into the primary beam and subsidiary beam so that the intensities thereof can be detected individually. Consequently, a super-resolution optical signal equivalent to the signal obtained in the case of using a circular beam thinner than the diffraction limited can be provided steadily. As a result, the super-resolution optical system, which is equivalent in performance to the super-resolution optical scanning system symmetrical with respect to the axis, can be implemented easily and stably with much advantage.

In the first or second super-resolution optical head apparatus, the phase plate is preferably provided integrally with the second coherent light source, the phase plate being in a position close to the second coherent light source with a spacing interposed therebetween or in direct contact with the second coherent light source. With the arrangement, the subsidiary beam can be provided steadily with the simple structure, so that the super-resolution optical signal, which is simple as well as compact, can be obtained with steadiness.

In the first or second super-resolution optical head apparatus, the first and second coherent light sources are preferably composed of a pair of linearly polarized laser beams disposed so as to have their planes of polarization perpendicular to each other. The pair of linearly polarized laser beams having their planes of polarization perpendicular to each other are incoherent to each other, so that the primary and subsidiary beams can have planes of polarization perpendicular to each other by simply establishing a specified positional relationship between the light emitting surfaces of the pair of linearly polarized laser beams, thereby easily implementing the super-resolution optical head apparatus.

In the first, or second super-resolution optical head apparatus, the light separating means is preferably composed of a substrate having a uniaxially anisotropic refractive index and a polarizing holographic optical element or a polarizing diffraction grating formed on the substrate, the light separating means being a polarization separating means for separating the light beam into the primary beam and the subsidiary beam through polarization separation. Since the holographic optical element or polarizing diffraction grating changes a majority of the energy component of one of the polarized primary and subsidiary beams into a ±first-order diffracted beam, while transmitting the other of the polarized primary and subsidiary beams as a zero-order diffracted beam, the light intensities of the primary and subsidiary beams can be detected by spatially separating the two beams with reliability. As a result, a more compact super-resolution optical system can be implemented at lower cost than in the case where a polarizing beam splitter is used.

In the first or second super-resolution optical head apparatus, the light separating means is preferably composed of a multilayer dielectric filter, the light separating means being a wavelength separating means for separating the light beam into the primary beam and the subsidiary beam through wavelength separation. Since the multilayer dielectric filter functions as a narrow bandpass filter, two wavelengths having a small difference therebetween can efficiently be separated from each other and detected due to the transmittance characteristic of the narrow-band pass filter and to the reflectance characteristic opposite to the transmittance characteristic, so that the primary and subsidiary beams having different wavelengths can be separated from each other through wavelength separation and the intensities thereof can be detected with reliability.

A third super-resolution optical head apparatus implements a super-resolution optical system by separating a coherent beam, by means of a polarizing phase plate, into a primary beam and a subsidiary beam having their plane of polarizations perpendicular to each other, of which the primary beam has a peak intensity in the center thereof and the subsidiary beam has peak intensities at least on both sides of the center of the primary beam, focusing the primary and subsidiary beams on an information storage surface, separating the light beam reflected from the information storage surface into the primary beam and the subsidiary beam again through polarization separation, and differentially detecting their intensities.

The third super-resolution optical head apparatus comprises: a coherent light source for emitting a coherent beam; a polarizing phase plate for receiving the coherent beam emitted from the coherent light source, separating the coherent beam into a primary beam and a subsidiary beam which has a plane of polarization perpendicular to a plane of polarization of the primary beam and an intensity distribution in which peak values are placed at least on both sides of a center of the primary beam and a principal portion thereof is equal in size to a principal portion of the primary beam, and emitting them;

a focusing means for superimposing the primary beam and subsidiary beam emitted from the polarizing phase plate upon each other and focusing them onto an information storage surface having an optical information storage carrier; a control means for controlling the focusing means such that a light beam composed of the primary beam and the subsidiary beam being superimposed upon each other performs focusing and tracking with respect to the optical information storage carrier of the information storage surface; a polarization separating means for receiving the light beam reflected from the information storage surface, separating the light beam into the primary beam and the subsidiary beam through polarization separation, and emitting them; an optical detecting means for individually detecting respective intensities of the primary beam and subsidiary beam emitted from the polarization separating means and outputting a light intensity signal; and a calculating means for calculating, based on the light intensity signal outputted from the optical detecting means, a super-resolution scanning signal and outputting it.

With the third super-resolution optical head apparatus, the primary beam and subsidiary beam having their planes of polarization perpendicular to each other can be obtained from the coherent beam emitted from the single coherent light source. The principal portions of the primary and subsidiary beams are equal in size to each other. The primary beam has a peak intensity at the center thereof, while the subsidiary beam has peak intensities at least on both sides of the center thereof. The primary beam and subsidiary beam are incoherently superimposed upon each other and focused onto the information storage surface for use in scanning without having their optical axes displaced from each other. The light beam obtained by superimposing the primary beam and subsidiary beam is reflected from the information storage surface and separated again into the primary and subsidiary beams through polarization separation, so that their intensities are individually detected. The detected intensities are differentially calculated so as to provide an output signal scanned as a difference between the intensities of the primary and subsidiary beams. As a result, a super-resolution scanning optical system, which is extremely stable and excellent, can be implemented by a remarkably simple structure.

In the third super-resolution optical head apparatus, the polarization separating means preferably comprises a substrate having a uniaxially anisotropic refractive index and a polarizing holographic optical element or a polarizing diffraction grating formed on the substrate. With the arrangement, a compact and low-cost super-resolution scanning optical can be implemented.

In the third super-resolution optical head apparatus, the polarizing phase plate preferably separates the coherent beam emitted from the coherent light source into an optical component having a plane of polarization in one direction and an optical component having a plane of polarization in another direction, the planes of polarization being perpendicular to each other, preferably emits, as the primary beam, the optical component having the plane of polarization in one direction, preferably has a first region which does not impart any relative phase difference to the optical component having the plane of polarization in another direction and a second region which imparts a relative phase difference of X to the optical component having the plane of polarization in another direction, and preferably emits, as the subsidiary beam, the optical component passing through the first and second regions. With the arrangement, the primary and subsidiary beams are generated simultaneously with polarization separation by guiding the coherent beam emitted from the single coherent light source to the polarizing phase plate. Consequently, the intensity distributions of the primary and subsidiary beams on their peripheral portions are identical in shape, so that their optical axes will never be displaced from each other even when scanning with the beams is performed. As a result, an optical signal which achieves super resolution at least in one dimension can be obtained with excellent stability.

In this case, the first and second regions are preferably formed around a center of the polarizing phase plate in four regions so that the two first regions alternate the two second regions. With the arrangement, the light beam obtained by superimposing the primary beam and the subsidiary beam having peak intensities in four directions extending from the center thereof is focused onto the information storage surface. The light beam reflected from the information storage surface is separated through polarization separation and their intensities are detected individually. Consequently, a super-resolution optical head apparatus equivalent to that obtained in the case of using a rectangular beam thinner than the diffraction limited can be implemented with stability.

In the third super-resolution optical head apparatus, the polarizing phase plate preferably separates the coherent beam emitted from the coherent light source into an optical component having a plane of polarization in one direction and an optical component having a plane of polarization in another direction, the planes of polarization being perpendicular (orthogonal) to each other, preferably emits the optical component having the plane of polarization in the one direction without imparting any relative phase difference thereto, preferably has N (N is an integer equal to or more than 2) regions around a center thereof which impart a relative phase difference advancing in the sequence of 0, $2\pi/N$, $(2\pi/N)\times 2$, $(2\pi/N)\times 3$, . . . , and $(2\pi/N)\cdot(N-1)$ to the optical component having the plane of polarization in the another direction, and preferably emits, as the subsidiary beam, the optical component passing through the N regions. With the arrangement, a super-resolution optical head equivalent to that obtained in the case of using a circular beam thinner than the diffraction limited can be implemented with stability.

A super-resolution optical head apparatus according to a fourth embodiment of the present invention uses a pair of pulse strings alternately generated from a single coherent light source, so that one of the pair of pulse strings is used as a primary beam having a peak intensity at the center thereof and the other pulse string is used as a subsidiary beam having peak intensities at least on both sides of the center of the primary beam as a result of phase modulation. The primary and subsidiary beams are focused onto an information storage surface. The pulse strings used as the primary and subsidiary beams reflected from the information storage surface have their intensities detected individually at different points in time, so as to differentially detect the light intensities corresponding to the primary and subsidiary beams to either one of which delay time is selectively imparted, thereby implementing a super-resolution optical system.

The fourth super-resolution optical head apparatus comprises: a coherent light source for emitting a coherent beam having a first pulse string and a second pulse string alternately generated in time sequence; a phase modulating means for receiving the coherent beam and emitting it by selectively imparting a phase shift to a wavefront of the coherent beam in synchronization with the first and second pulse strings, as a primary beam composed of the first pulse string and a subsidiary beam composed of the second pulse string, the subsidiary beam having an intensity distribution in which peak values are placed at least on both sides of a center thereof on a plane perpendicular to an optical axis of the primary beam and a principal portion thereof is equal in size to a principal portion of the primary beam; a focusing means for focusing the primary beam and subsidiary beam emitted from the phase modulating means onto an information storage surface having an optical information storage carrier; a control means for controlling the focusing means such that the primary beam and subsidiary beam perform focusing and tracking with respect to the optical information storage carrier of the information storage surface; an optical detecting means for alternately detecting respective intensities of the primary beam and subsidiary beam reflected from the information storage surface at different points in time and outputting a light intensity signal; a delay means for selectively imparting, to the light intensity signal outputted from the optical detecting means, delay time corresponding to a time interval between the first pulse string and the second pulse string; and a calculating means for calculating a super-resolution scanning signal based on the light intensity signal outputted from the optical detecting means and on the light intensity signal to which the delay means has imparted the delay time and outputting it.

With the fourth super-resolution optical head apparatus, the primary beam and subsidiary beam are obtained as the pair of pulse strings emitted from the single coherent light source and isolated in time sequence. The principal portions of the primary and subsidiary beams are equal in size to each other. The primary beam has a peak intensity at the center thereof, while the subsidiary beam has peak intensities at least on both sides of the center thereof. Although the primary and subsidiary beams are directed to the information storage surface at different points in time, they are equivalently superimposed incoherently upon each other and focused onto the information storage surface. Subsequently, the primary and subsidiary beams are reflected from the information storage surface as the light beam controlled for focusing and tracking and their intensities are alternately detected at different points in time. Either one of light intensity signals corresponding to the detected intensities is selectively delayed and then they are differentially calculated, so as to provide an output signal equivalently calculated as a difference in intensity distribution between the primary beam and the subsidiary beam. Thus, the signal processing of the primary and subsidiary beams isolated in time sequence is performed by using the single coherent light source as well as the single integrated optical detector and the delay element, so that the super-resolution optical head apparatus can be implemented by a simple optical system.

A fifth super-resolution optical head apparatus according to the present invention is for: separating a coherent beam emitted from a single coherent light source, by means of a polarizing phase plate, into a primary beam and a subsidiary beam having planes of polarization perpendicular (orthogonal) to each other, of which the primary beam has a peak intensity at the center thereof and the subsidiary beam has peak intensities at least on both sides of the center of the primary beam; focusing, in an optical system in an outward trip (forward path), the primary and subsidiary beams onto an information storage surface; and diffracting, in a return trip (backward path), the primary beam reflected from the information storage surface by means of a holographic optical element, while separating the primary beam and the subsidiary beam through polarization separation so as to differentially detect the intensities thereof, thereby implementing a super-resolution optical system.

The fifth super-resolution optical head apparatus comprises: a coherent light source for emitting a coherent beam; a polarizing phase plate for separating the coherent beam emitted from the coherent light source into a primary beam and a subsidiary beam which has a plane of polarization perpendicular (orthogonal) to a plane of polarization of the primary beam and an intensity distribution in which peak values are placed at least on both sides of a center of the primary beam and a principal portion thereof is equal in size to a principal portion of the primary beam and emitting them; a focusing means for superimposing the primary beam and subsidiary beam emitted from the polarizing phase plate upon each other and focusing them onto an information storage surface having an optical information storage carrier; a control means for controlling the focusing means such that a light beam composed of the primary beam and the subsidiary beam being superimposed upon each other performs focusing and tracking with respect to the optical information storage carrier of the information storage surface; a holographic optical element provided integrally with the focusing means, the holographic optical element diffracting the light beam in a return trip reflected from the information storage surface and introducing the diffracted light beam onto a plane substantially flush with a light emitting surface of the coherent light source; a polarization separating means for receiving the light beam in the return trip which has been diffracted by the holographic optical element and separating the light beam in the return trip into the primary beam and the subsidiary beam through polarization separation; an optical detecting means provided on the plane substantially flush with the light emitting surface of the coherent light source, the optical detecting means individually detecting respective intensities of the primary beam and subsidiary beam emitted from the polarization separating means and outputting a light intensity signal; and a calculating means for calculating, based on the light intensity signal outputted from the optical detecting means, a super-resolution scanning signal and outputting it.

With the fifth super-resolution optical head apparatus, the primary beam and subsidiary beam having their planes of polarization perpendicular (orthogonal) to each other can be obtained from the coherent beam emitted from the single coherent light source. The principal portions of the primary beam and subsidiary beam are substantially equal in size to each other. The primary beam has a peak intensity on the optical axis thereof, while the subsidiary beam has peak intensities on both sides of the center thereof. In an outward trip, the primary beam and subsidiary beam are incoherently superimposed upon each other and focused onto the information storage surface. The light beam obtained by superimposing the primary and subsidiary beams on the information storage surface is reflected therefrom and diffracted, in a return trip, by a holographic optical element off the optical axis and then separated by the polarization separating means through polarization separation, so that their intensities are detected individually. By differentially calculating the respective detected intensities, an output signal scanned equivalently as an output signal scanned as a difference in intensity distribution between the primary beam and the subsidiary beam can be obtained, so that the super-resolution signal can easily be obtained with reliability.

In the fifth super-resolution optical head apparatus, since the single coherent light source and the optical detector are provided on the same plane, it can easily be assembled and adjusted, while exhibiting excellent stability to secular changes in the optical configuration, temperature changes, and mechanical changes. Moreover, since the focusing means is formed integrally with the holographic optical element, the super-resolution optical head apparatus can be implemented by a compact and simple optical system.

BRIEF DESCRIPTION OF THE DRAWINGS

FIGS. 2(a) and 2(b) are schematic views each illustrating, using a one-dimensional model, the production of a subsidiary beam and the structural principle of the super-resolution optical system, which are common to all the embodiments of the present invention;

DETAILED DESCRIPTION OF THE INVENTION (First Embodiment)

Figure 1:
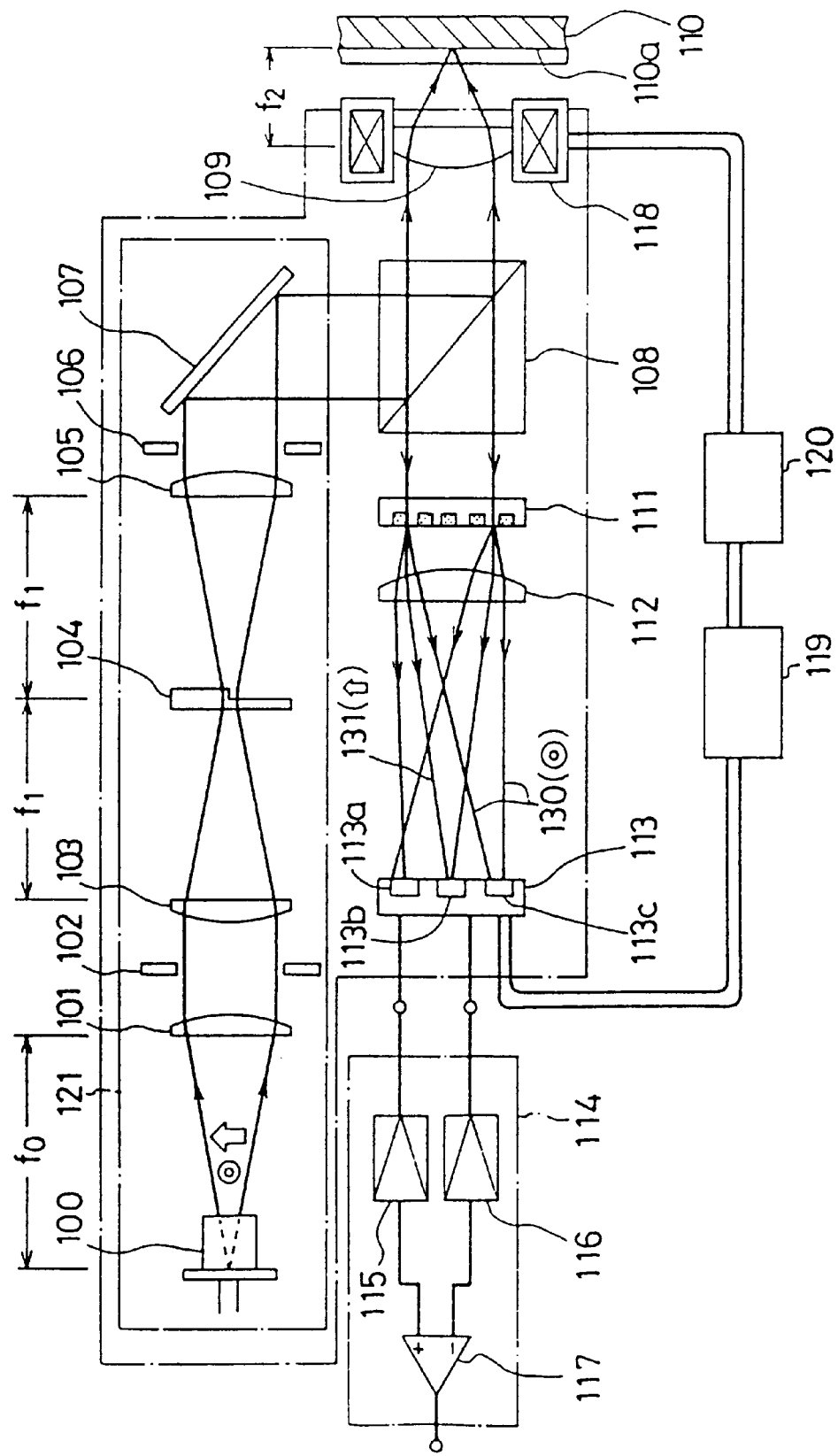
FIG. 1 is a schematic view showing the structure of a super-resolution optical head apparatus according to a first embodiment of the present invention.

FIG. 1 schematically shows the structure of a super-resolution optical head apparatus according to a first embodiment of the present invention.

As shown in FIG. 1, a light beam is emitted from a coherent light source 100 composed of a semiconductor laser. After sequentially passing through a collimator lens 101, an aperture 102, and a condenser lens 103, the light beam illuminates a polarizing phase plate 104 and is divided thereby into a primary beam and a subsidiary beam having their planes of polarization perpendicular (orthogonal) to each other. After sequentially passing through a collimator lens 105 and an aperture 106, the resulting primary beam and subsidiary beam are reflected by a mirror 107 and have their directions changed by a beam splitter 108, so that they are focused onto an information storage surface 110a of an optical disk 110, in which information is stored in the form of pits, by an objective lens 109. The primary beam and subsidiary beam reflected from the information storage surface 110a are turned into parallel beams again by the objective lens 109 and travel in straight lines through the beam splitter 108. Thereafter, the primary beam 130 is diffracted by a polarizing holographic optical element 111, which will be described later, and focused by a condenser lens 112 so as to reach a first optical detector 113a and a third optical detector 113c. On the other hand, the subsidiary beam 131 is also focused by the condenser lens 112 so as to reach a second optical detector 113b. The first to third optical detectors 113a to 113c constitute an integrated optical detecting unit 113, the structure of which will be described later in greater detail.

Electric signals outputted from the first and third optical detectors are synthesized and then amplified by a first amplifier 115, while an electric signal outputted from the second optical detector 113b is amplified by a second amplifier 116. Output signals from the first and second amplifiers 115 and 116 are calculated by a differential calculator 117.

In FIG. 1, a reference numeral 118 designates an electromagnetic driving means (a voice-coil-type actuator); 119 designates a calculating means for calculating a focusing error signal and a tracking error signal; and 120 designates a driving unit for driving the electromagnetic driving means 118 in response to an output signal from the calculating means 119.

The first embodiment is characterized by the structure of a beam-shaping optical-system unit 121, which enables easy and stable formation of the subsidiary beam equal in size to the primary beam and having an intensity distribution substantially equal to the primary beam in the peripheral portion, except in the central portion.

An effect peculiar to the first embodiment is as follows: since the primary beam and subsidiary beam are formed from the light beam emitted from the single coherent light source 100, the intensity of the primary beam is equal to that of the subsidiary beam on the periphery of the main lobe, in contrast to the case where the primary beam and subsidiary beam are formed by means of separate semiconductor lasers and separate optical systems, so that a stable scanning optical system free from the displacements of the optical axes can be obtained.

Normally, the semiconductor laser composing the coherent light source 100 is a commercially available light source, which emits a linearly polarized beam in a single transverse mode. In the first embodiment, the plane of polarization is set at an angle of about 45° with respect to the paper face. With the setting, components obtained by multiplying the amplitude of linearly polarized light by sin 45° exist as polarized light components in the direction parallel to the paper face and in the direction perpendicular to the paper face. On the other hand, the crystal axis of the polarizing phase plate 104 (see FIG. 11(e)) is set such that the Z-Y plane thereof coincides with the paper face, thereby forming the primary beam (ordinary ray) 130 and the subsidiary beam (extraordinary ray) 131. In the first embodiment, the polarizing phase plate 140 can be composed of a plate having phase regions, which will be described later with reference to FIGS. 9 and 10. The first embodiment generally provides a two-dimensional super-resolution optical head apparatus which is remarkably stable.

In the first embodiment, even when the aperture 102 is slightly reduced in size so that the beam size on the polarizing phase plate 104 surpasses 1.5 times the beam size of the diffraction limited of the objective lens 109, the effect of the first embodiment is not particularly changed. This is because, as is clear from the principle of the present invention, the main lobes of the primary beam and subsidiary beam have the same profile except in the central portion and, even if a slight difference exists therebetween, the intensity of the primary beam and that of the subsidiary beam are offset by differential detection.

FIGS. 2(a) and 2(b) are for diagrammatically illustrating the intensity distributions of the primary beam 130 and of the subsidiary beam 131 on the information storage surface in the first embodiment. In FIG. 2(a), an $X_S$-axis is provided across the polarizing phase plate 104 for the purpose of illustrating the principle of super-resolution of the present invention by using a simple one-dimensional model. Here, it is assumed that the primary beam 130 is also incident upon the $X_S$-axis and has the same beam waist diameter $W_1$ as the subsidiary beam 131. The collimator lens 105 in FIG. 1 corresponds to a first convex lens 150 in FIG. 2(a). The objective lens 109 in FIG. 1 corresponds to a second convex lens 151 in FIG. 2(a). The first aperture 106 in FIG. 1 corresponds to an aperture 152 in FIG. 2(a). However, the diameter $W_1$ of a light beam at a wavelength $\lambda$ is set approximately 1.5 times as large as the beam diameter $W_R$ ($W_R$ is approximately equal to $\lambda/(N \cdot A) = \lambda/\sin\alpha_1$) of the diffraction limited for the diameter D of the aperture 152.

The first and second convex lenses 150 and 151 are Fourier transform lenses, which satisfy the following simultaneous equations of $$f_1 \cdot \sin \alpha_1 = f_2 \cdot \sin \alpha_2 = D/2 \quad (1)$$

In this case, the principal portion of the intensity distribution 160 of the primary beam 130 is equal in size to that of the intensity distribution 161 of the subsidiary beam 131 on the $X_0$-axis in an image forming plane, which becomes $W_2$ ($W_2$ is approximately equal to $(f_2/f_1) \cdot W_1$).

The polarizing phase plate 104 is a substrate having the phase boundary with a difference in level $d_1$, which imparts, on the optical axis, a phase difference $\pi$ to a specified polarized light component, and having a refractive index n with respect to the light beam at the wavelength $\lambda$, which satisfies the equation of $(n-1) \cdot d \lambda/2$. Accordingly, the intensity distribution 161 of the subsidiary beam 131 mentioned above can be obtained as a result of the overlapping of two wavefronts 162 and 163 having amplitude distributions in opposite phases on the $X_0$-axis. As shown in FIG. 2(b), only that portion of the subsidiary beam 131 which is depressed in the vicinity of the optical axis remains as a difference $I_d$ ($x_0$) between the intensity distribution 161 of the subsidiary beam 131 and the intensity distribution 160 of the primary beam 130 and the full width half maximum $g_0$ becomes about 70% of the full width maximum $g_g$ of the diffraction limited in size.

As described earlier, the above principle of super-resolution is implemented by an integrated detecting unit 113 consisting of the first to third detectors 113a, 113b, and 113c for detecting the intensities of the primary and subsidiary beams 130 and 131 and by a signal processing unit 114.

Figure 3:
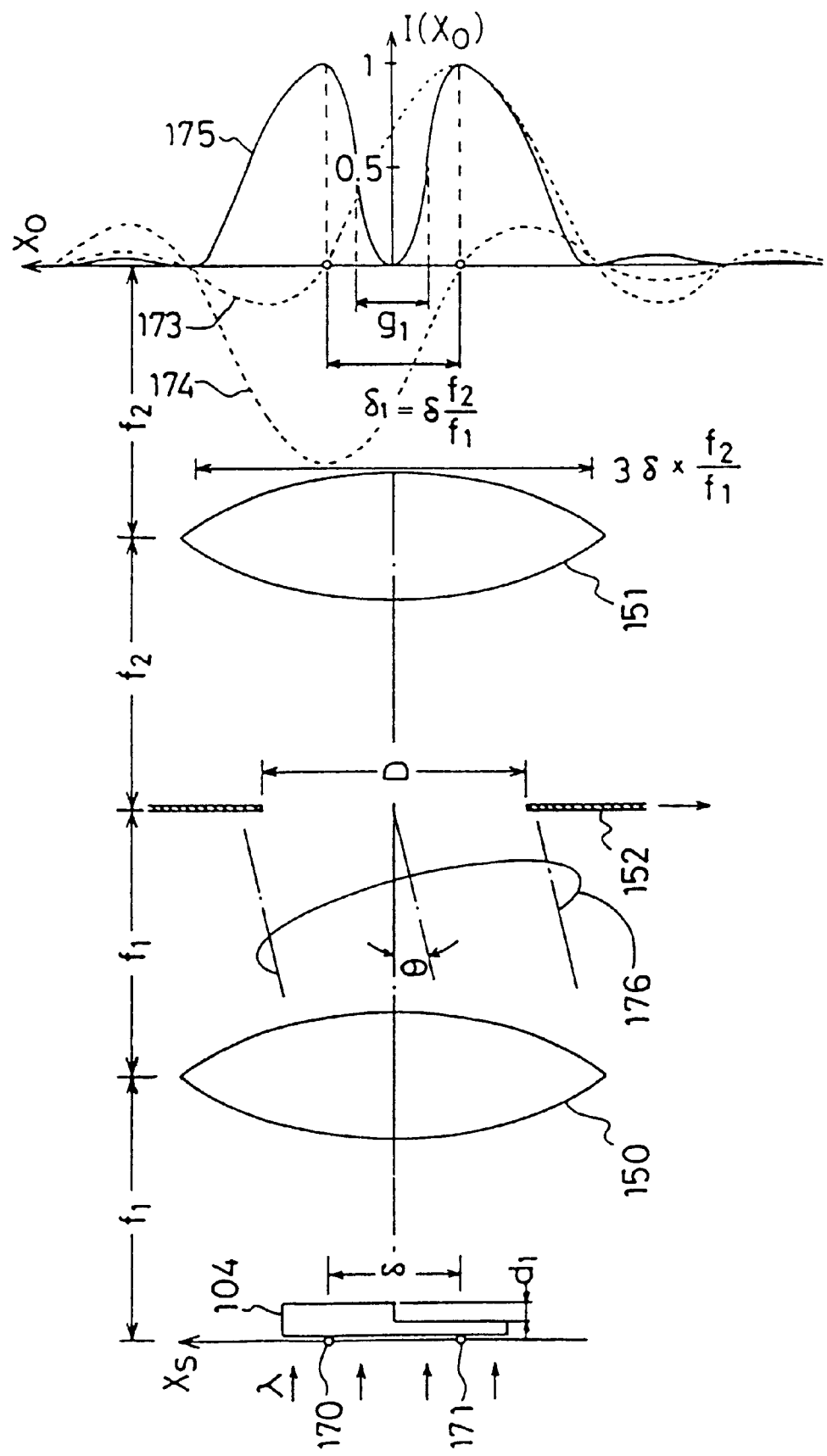
FIG. 3 is a schematic view illustrating, using a simple one-dimensional model, the principle of the super-resolution optical system which is common to all the embodiments of the present invention.

FIG. 3 diagrammatically shows a variation which is an optical system similar to the optical system shown in FIG. 2 but which can be analytically handled for easy understanding. The optical system of FIG. 3 is different from that of FIG. 2 in that the subsidiary beam 131 is given by two points 170 and 171 which are apart from each other by a distance $\delta = (\lambda \cdot f_1)/D$. The diffraction images corresponding to the two points 170 and 171 on the $X_0$-axis constitute the amplitude distributions 173 and 174 of the diffraction limited via the rectangular aperture 152, which are different in phase by $\pi$. The centers of the amplitude distributions 173 and 174 are apart from each other by $\delta_1 = \delta \times (f_2/f_1)$. Since the distances $\delta$ and $\delta_1$ are set such that one amplitude becomes 0 in the peak position of the other, the intensity distribution 175 as shown in FIG. 3 can be obtained. If analytically shown, the complex amplitude distribution $u_1(X_0)$ of a double-humped beam obtained as the subsidiary beam 131 on the $X_0$-axis becomes $$u_1(X_0) = C_1 \times \text{sinc}[\{2\pi/(\lambda \cdot f_2)\} \times (D/2) \times \{X_0 + (\delta_1/2)\}] - \quad (2)$$
$$C_1 \times \text{sinc}[\{2\pi/(\lambda \cdot f_2)\} \times (D/2) \times \{X_0 - (\delta_1/2)\}]$$

and the intensity distribution $I(X_0)$ becomes $$I(X_0) = |u_1(X_0)|^2 \quad (3)$$

In the foregoing equation (2), $$\text{sincX} = (\sin X)/X \quad (4)$$

is satisfied.

$$\delta_1 = \delta \times (f_2/f_1) \quad (5)$$
$$= (f_2 \cdot \lambda)/D$$
$$= (1/2) \cdot (\lambda/\sin\alpha_2)$$

concerns the resolving power of an optical head having a numerical aperture of $\sin\alpha_2$, which corresponds to the criterion of Rayleigh (in general, the minimum separation of two adjacent points that can be resolved). A description will be given later to an expansion into two dimensions. In that case, the Bessel function of the first kind $J_1$ (r) is used instead of the sinc function to represent the amplitude and intensity distributions of the Airy pattern. The amplitude distribution of the Airy pattern which is formed on an optical axis through a circular aperture is represented by $$u(r) = (2\pi(D/2)^2 \cdot J_1(R))/R \quad (6)$$

where r is a distance from the center of the optical axis and R is given by $R = (\pi \cdot D \cdot r)/(\lambda \cdot f_2)$.

The size of a main lobe termed the Airy disk is given by $$A = 2 \times 1.22 \times (\lambda \cdot f_2)/D \quad (7)$$

which is only 1.22 times as large as the size B of the main lobe obtained through a rectangular aperture, which is given by $$B = 2 \times (\lambda \cdot f_2)/D \quad (8)$$

Thus, the diameter of the trough in the center of the double-humped beam formed by the subsidiary beam 131 focused on the information storage surface becomes about 70% of the beam diameter of the diffraction limited of the second convex lens 151 (objective lens 109 in FIG. 1), which can be derived by in computer simulation. The dimensions of the principal portion of the primary beam 130 are equated with those of the principal portion of the subsidiary beam 131 and the primary beam 130 and subsidiary beam 131 are detected individually, followed by calculations by the differential calculator (differential amplifier) 117. In this manner, an output signal from the differential calculator 117 equivalently corresponds to a signal scanned with a beam size about 70% of the diffraction limited, since signal components corresponding to the peripheral portion of the two beams are canceled after the signal processing. The size of the primary beam 130 and the size of the subsidiary beam 131 can be adjusted by means of the aperture 102 in FIG. 1.

Figure 9A:
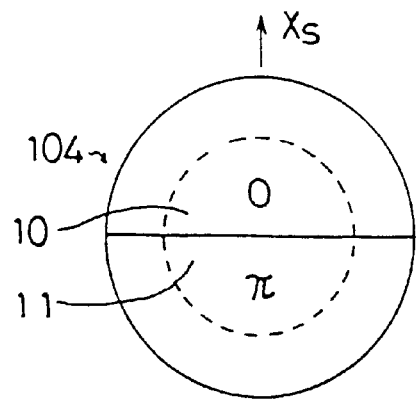
FIGS. 9(a), 9(b), and 9(c) are for illustrating an example of the structure of a phase plate for generating the subsidiary beam, which is common to the respective embodiments of the present invention.

As shown in FIG. 9(a), the phase region of the polarizing phase plate 104 (or a normal phase plate) is constituted by a first region 10 having a normal thickness and a second region 11 which is different in thickness from the first region 10 by $d_1$. It has already been described that, with the arrangement, the double-humped distribution of light intensity can be obtained in the $X_S$-direction of FIG. 9(a). Hence, the one-dimensional effect of super-resolution is achieved in the $X_S$-direction. In the case of forming the primary beam 130 and subsidiary beam 131 with the separate optical systems, as will be described later with reference to FIG. 5, the same effect can be obtained using a non-polarizing phase plate instead.

Figure 9B:
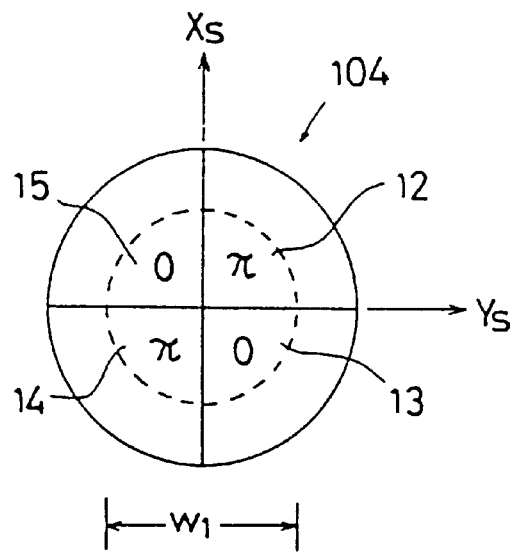
Figure 9C:
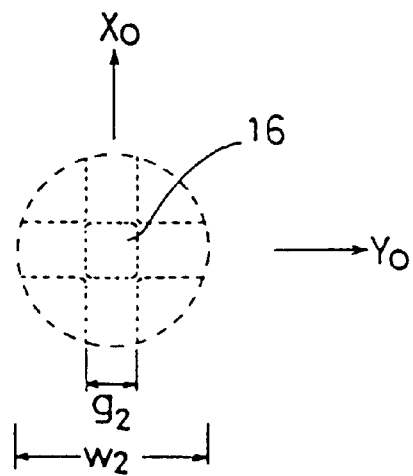

FIG. 9(b) shows another example of the constitution of the polarizing phase plate 104 (or a normal phase plate), in which the polarizing phase plate 104 consists of four regions 12, 13, 14, and 15 so that a two-dimensional trough 16, which is lower in light intensity, is implemented in the center of the subsidiary beam 131, as diagrammatically shown in FIG. 9(c).

Figure 10A:
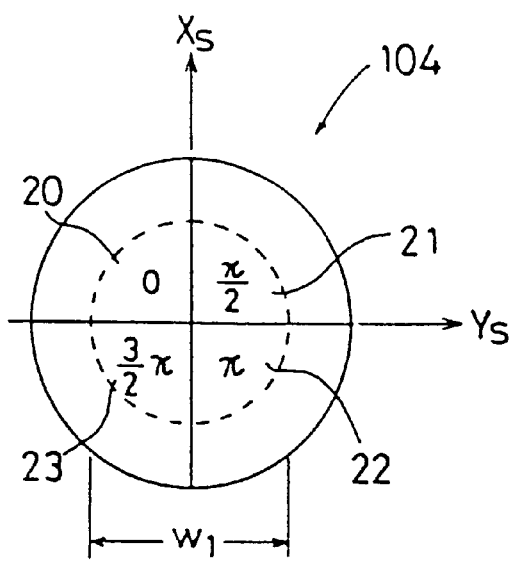
FIGS. 10(a), 10(b), 10(c), and 10(d) are for illustrating another example of the structure of the phase plate for generating the subsidiary beam, which is common to the respective embodiments of the present invention.
Figure 10B:
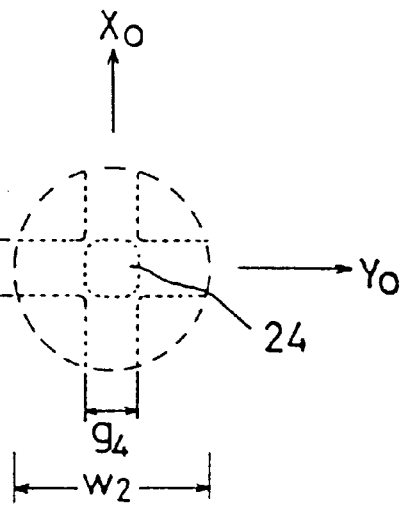

FIG. 10(a) shows another more preferable example of the constitution of the phase region of the polarizing plate 104 (or a normal phase plate), in which four regions 20, 21, 22, and 23 for sequentially providing 0, $\pi/2$, $\pi$, and $(3/2)\pi$ are formed around the optical axis such that the phase difference between every other adjacent regions becomes $\pi$. With the arrangement, the central portion 24 of the image forming plane diagrammatically shown in FIG. 10(b) presents an intensity distribution with a deeper trough than in the case shown in FIG. 9(b).

Figure 10C:
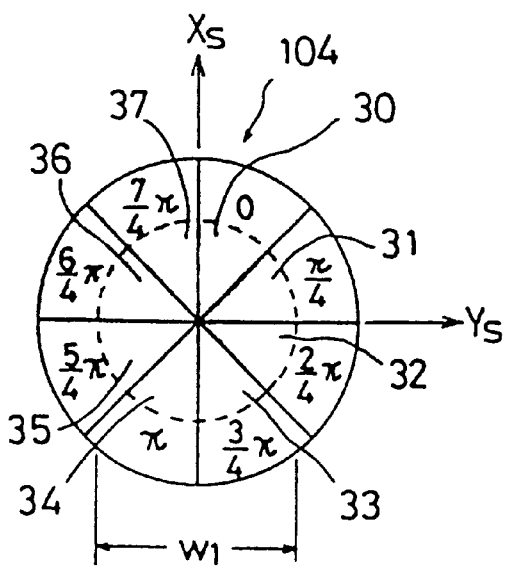
Figure 10D:
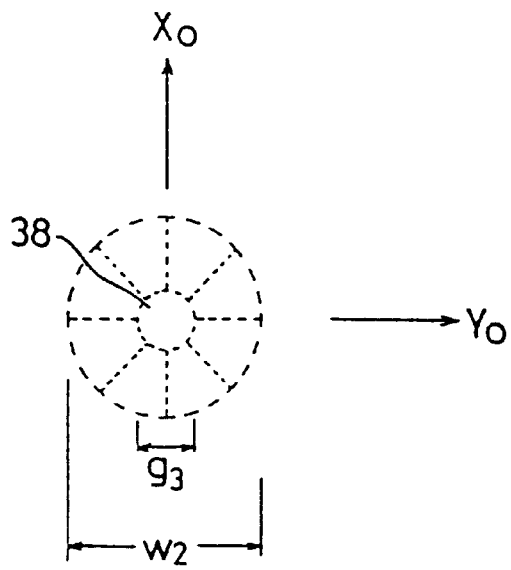

FIG. 10(c) also shows still another example of the constitution of the phase region of the polarizing phase plate 104 (or a normal phase plate), in which the idea described above is further developed and eight regions 30, 31, 32, 33, 34, 35, 36, and 37 are formed by equally dividing the polarizing phase plate 104 around the center thereof. Each adjacent two of the eight regions provide a phase difference of $2\pi/8$ so that the relative phase difference, starting from 0, advances stepwise till it reaches $2\pi$. Accordingly, the phase difference provided by each opposing two of the eight regions (i.e., each two regions in directly opposite positions with an angle of 180° formed therebetween) becomes $\pi$. Thus, by equally dividing the polarizing phase plate 104 into N phase regions around the center thereof so that a phase difference of $2\pi/N$ is provided by each adjacent two of the N regions, the substantially ideal subsidiary beam 131 which is symmetrical with respect to the optical axis can be formed. In practice, N=8 is adopted so that the central portion 38 of the subsidiary beam 131 on the information storage surface ($X_0$, $Y_0$) shown in FIG. 10(d) presents a roughly symmetrical distribution with respect to the optical axis.

Figure 11A:
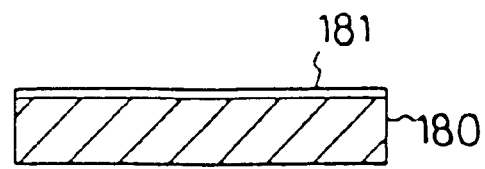
FIGS. 11(a), 11(b), 11(c), 11(d), and 11(e) are views for illustrating an example of the structure of a polarizing diffraction grating in the fourth embodiment of the present invention.

FIG. 11(a) to 11(d) show an example of the process of fabricating the polarizing phase plate 104. Initially, as shown in FIG. 11(a), a Ta film 181 is formed by sputtering to a thickness of 230 Å on the surface of a substrate 180 (X-plate) made of a crystal of lithium niobate (LiNbO$_3$). The substrate 180 has a thickness of 500 $\mu$m and its refractive index is uniaxially anisotropic.

Figure 11B:
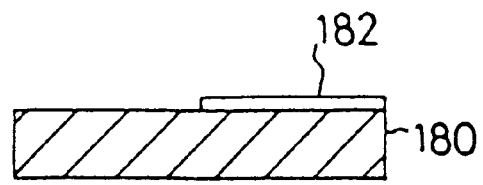

Next, as shown in FIG. 11(b), the Ta film 181 is patterned by photolithography and dry etching, thereby forming a hemispherical proton substitution mask 182.

Figure 11C:
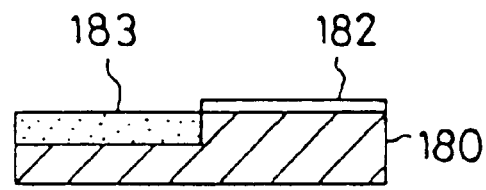

Then, as shown in FIG. 11(c), a heat treatment at a temperature of 260° C. is performed with a pyrophosphoric acid ($H_4P_2O_7$) using the proton substitution mask 182, so as to form a proton substitution region 183 which is 2.38 $\mu$m deep.

Figure 11D:
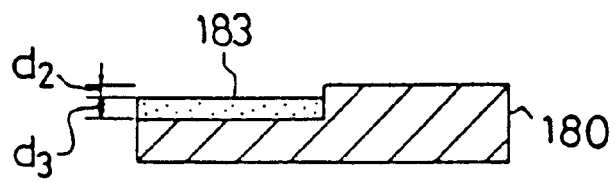
Figure 11E:
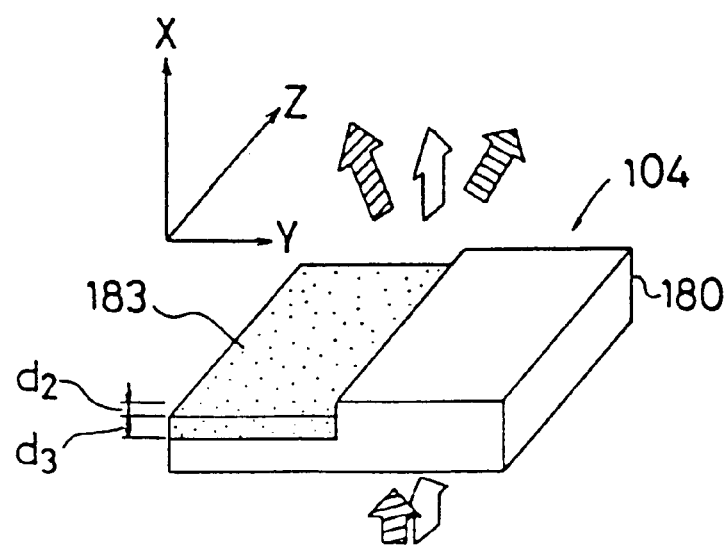

Subsequently, as shown in FIG. 11(d), a phase compensation trench (with a depth of $d_2$) is formed in the proton substitution region 183 by etching using a hydrofluoric acid (HF), thus providing the polarizing phase plate 104 as shown in FIG. 11(e). The Ta film 181 is promptly removed by the hydrofluoric acid and, thereafter, the proton substitution region 183 is selectively etched.

The polarizing phase plate 104 thus fabricated serves as a phase plate imparting a phase difference varying stepwise to a polarized light component (referred to as an ordinary ray) having a plane of polarization in the Y-direction, while serving as a uniform transparent substrate with respect to a polarized light component (referred to as an extraordinary ray) having a plane of polarization in the Z-direction. As for a method of forming the above phase compensation trench, it will be described later in detail.

The requirements for the polarizing phase plate 104 to impart a phase difference n to the ordinary ray and to serve as the uniform transparent substrate with respect to the extraordinary ray are generally satisfied if the following equations are satisfied:

$$(2\pi/\lambda) \times \{\Delta n_0 \times d_3 + (1-n_0) \times d_2\} = -\pi \quad (9)$$

$$(2\pi/\lambda) \times \{\Delta n_e \times d_3 + (1-n_e) \times d_2\} = 0 \quad (10)$$

where $d_3$ is the thickness of the proton substitution region 183, $d_2$ is the depth of the phase compensation trench, $\lambda$ is the wavelength of incident light, $n_0$ is the refractive index of the ordinary ray with respect to the substrate (proton non-substitution region) 180, $n_e$ is the refractive index of the extraordinary ray with respect to the substrate (proton non-substitution region) 180, $\Delta n_0$ is a reduction in refractive index due to proton substitution with respect to the ordinary ray, and $\Delta n_e$ is an increment in refractive index due to proton substitution with respect to the extraordinary ray.

By way of example, Table 1 shows the refractive indices of the substrate 180 made of lithium niobate and variations in refractive indices thereof due to proton substitution.

TABLE 1

|  | SUBSTRATE | VARIATION IN REFRACTIVE INDEX |
|---|---|---|
| ORDINARY RAY (y) | $n_0$<br>2.260 | $\Delta n_0$<br>−0.04 |
| EXTRAORDINARY RAY (x) | $n_e$<br>2.177 | $\Delta n_e$<br>0.145 |

In FIG. 11, (0, $\pi$) indicates the polarizing phase plate 104 formed as two simply one-dimensional regions. However, it is also possible to fabricate, in accordance with the same process, the polarizing phase plate 104 having the regions shown in FIGS. 9 and 10 so as to implement a two-dimensional super-resolution scanning optical system. In this case, in a region in which a phase difference φ other than π is imparted to the ordinary ray, −φ is placed on the right side of the equation (9).

Figure 7A:
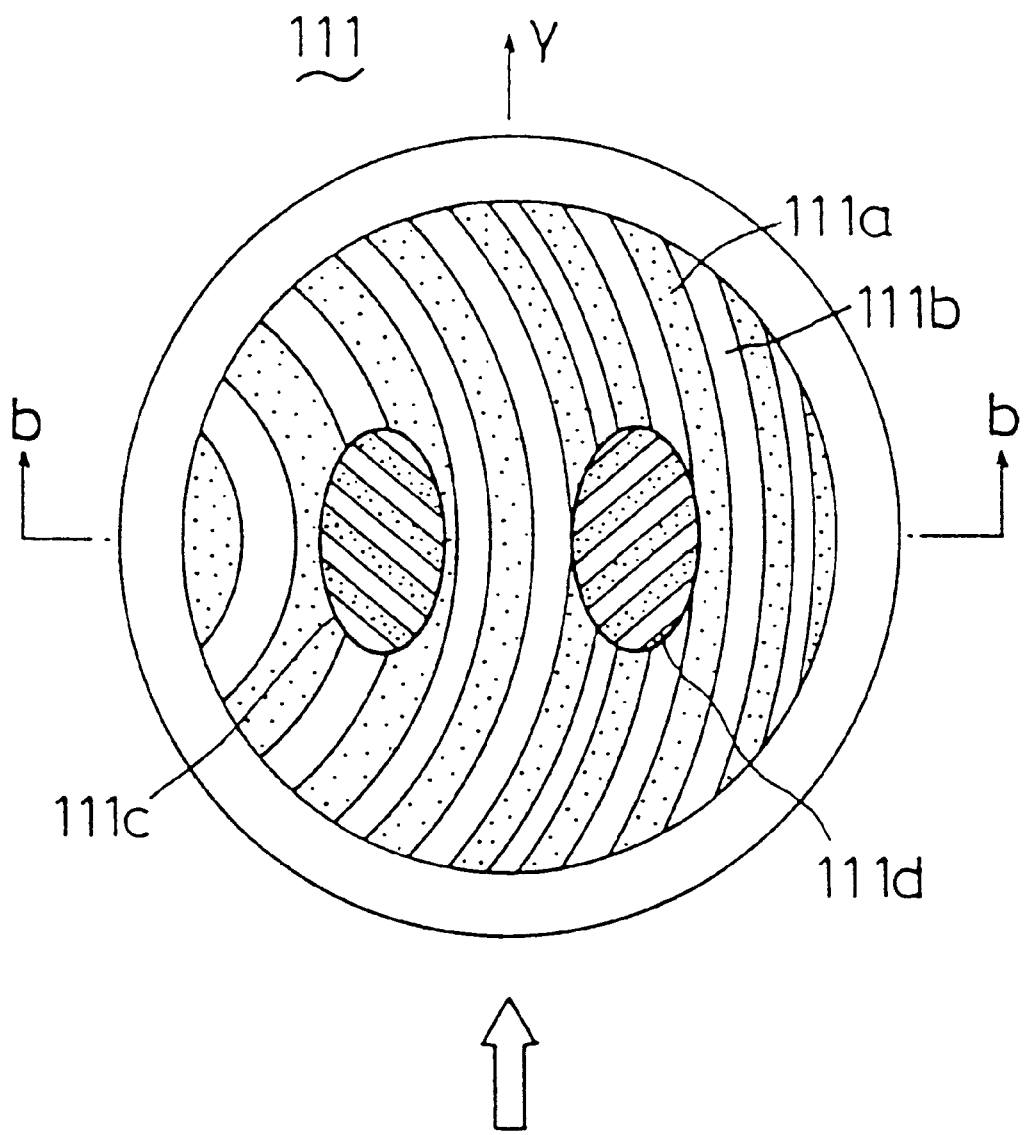
FIGS. 7(a) and 7(b) are schematic views showing the structures of polarizing holographic optical elements in the is first and second embodiments of the present invention.
Figure 7B:
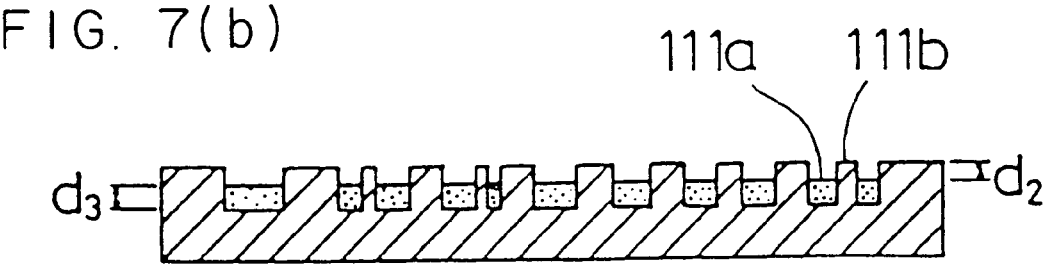

FIG. 7(a) schematically shows the structure of the polarizing holographic optical element 111 produced in the same process as the polarizing phase plate 104 using the substrate made of lithium niobate described above with reference to FIG. 11. FIG. 7(b) shows a cross-sectional structure taken along the line b—b of FIG. 7(a). FIG. 7(a) shows proton substitution regions 111a, proton non-substitution regions 111b, and diffraction grating patterns 111c and 111d for detecting a pushpull signal for detecting a tracking error signal, all of which constitute the pattern of an off-axis Fresnel zone plate for detecting a focus.

The polarizing holographic optical element 111 consists of the proton substitution regions 111a and the proton non-substitution regions 111b. The depth $d_2$ of the phase compensation trenches and the thickness $d_3$ of a proton substitution layer satisfy the above equations (9) and (10).

Figure 8:
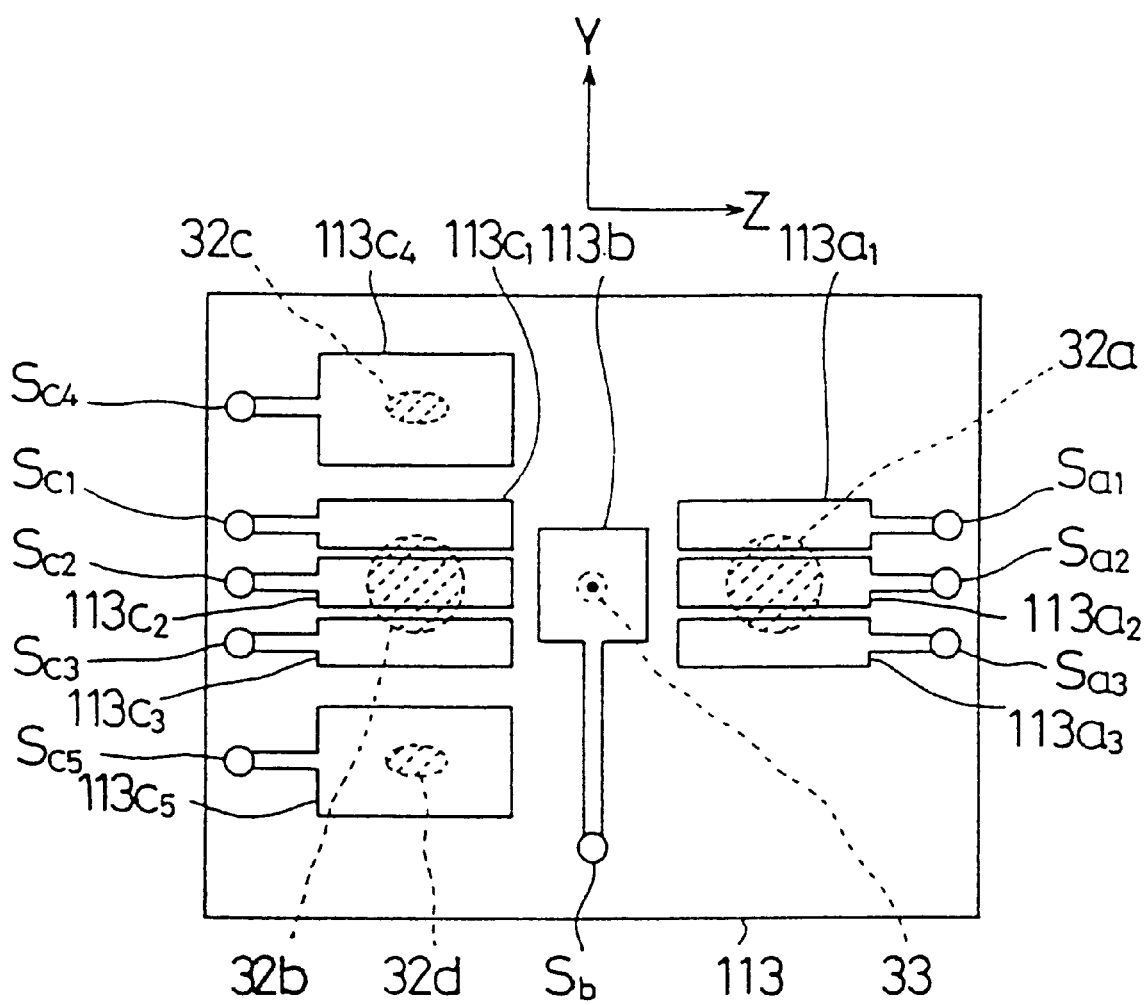
FIG. 8 is a view for illustrating an example of the structure of an integrated optical detecting unit which is common to the first and second embodiments of the present invention.

FIG. 8 shows the structure of the integrated detecting unit 113 described above. The beams 32a and 32b, which are ±first-order diffracted beams (ordinary rays), reach a pair of three-part optical detectors consisting of optical detecting elements $113a_1$, $113a_2$, and $113a_3$ (corresponding to the first optical detector 113a in FIG. 1) and optical detecting elements $113c_1$, $113c_2$, and $113c_3$ (corresponding to the third optical detector 113c in FIG. 1), respectively, thereby providing a focusing error signal to the optical detectors in accordance with spot size detection (SSD) method. The O-order diffracted beam (extraordinary ray) 33 passing through the polarizing holographic optical element 111 reaches the second optical detector 113b. The tracking error signal is obtained through differential detection of the intensities of the beams 32c and 32d incident upon optical detecting elements $113c_4$ and $113c_5$.

Techniques for detecting a servo signal using a holographic optical element as described above are disclosed in Japanese Laid-Open Patent Publication Nos. 50-78341, 62-251025, 62-251028, and 63-229640 and in U.S. Pat. No. 4,929,823. On the other hand, an optical head using a polarizing holographic optical element is disclosed in U.S. Pat. No. 5,062,098.

From the description given above with respect to FIGS. 1 to 3, it is apparent that the present first embodiment enables the reading of information stored on the information storage surface 110a of the optical disk 111 by super resolution (see FIG. 1). In short, by differentially calculating the sum of the respective signals in which the primary beam is detected ($S_{a1}$ to $S_{a3}$ and $S_{c1}$ to $S_{c5}$) and the signal $S_b$ in which the subsidiary beam is detected, there can be performed the reading of information by super resolution equivalent to scanning an RF signal with about 70% of the beam size of the diffraction limited of the objective lens 109.

Below, a description will be given to a first variation of the first embodiment.

Although the focusing error signal and the tracking error signal have been obtained by using the primary beam (ordinary ray) in the first embodiment, it is also possible to constitute the holographic optical element such that the subsidiary beam (extraordinary beam) is diffracted, thereby providing the servo signal. In this case, it is sufficient to simply change the direction of the crystal axis of the substrate by rotating it 90° and form the holographic optical element thereon, without changing the direction of the holographic pattern shown in FIG. 7. As a result, the intensity of the subsidiary beam becomes approximately 0 in the vicinity of the optical axis, while it becomes large in the vicinity of the periphery of the lens, so that a highly modulated tracking error signal corresponding to the push-pull signal is obtained.

Below, a description will be given to a second variation of the first embodiment.

In the second variation of the first embodiment, a third structure for providing the tracking signal can be provided. Specifically, all the surfaces of the holographic optical element are constituted by the Fresnel zone plates 111a and 111b, without the provision of the diffraction grating patterns 111c and 111d shown in FIG. 7. In this case, the second optical detector 113b for detecting the subsidiary beam shown in FIG. 8 can be composed of two separate optical detectors with a division extending in the direction of Y in FIG. 8 (though not shown in FIG. 8) such that the tracking signal can be obtained using differential outputs from the two optical detectors.

With the arrangement, the tracking error signal can be obtained without being affected by the focusing error signal resulting from the main beam, thereby implementing stable tracking servo control. Although the stable detection of the tracking error signal becomes more difficult as the spacing between any two adjacent tracks is reduced, the present variation utilizes the characteristic of the double-humped or quadruple-humped beam pattern for tracking control with the subsidiary beam in order to read information from the optical disk with tracks at reduced spacing.

(Second Embodiment)

Figure 4:
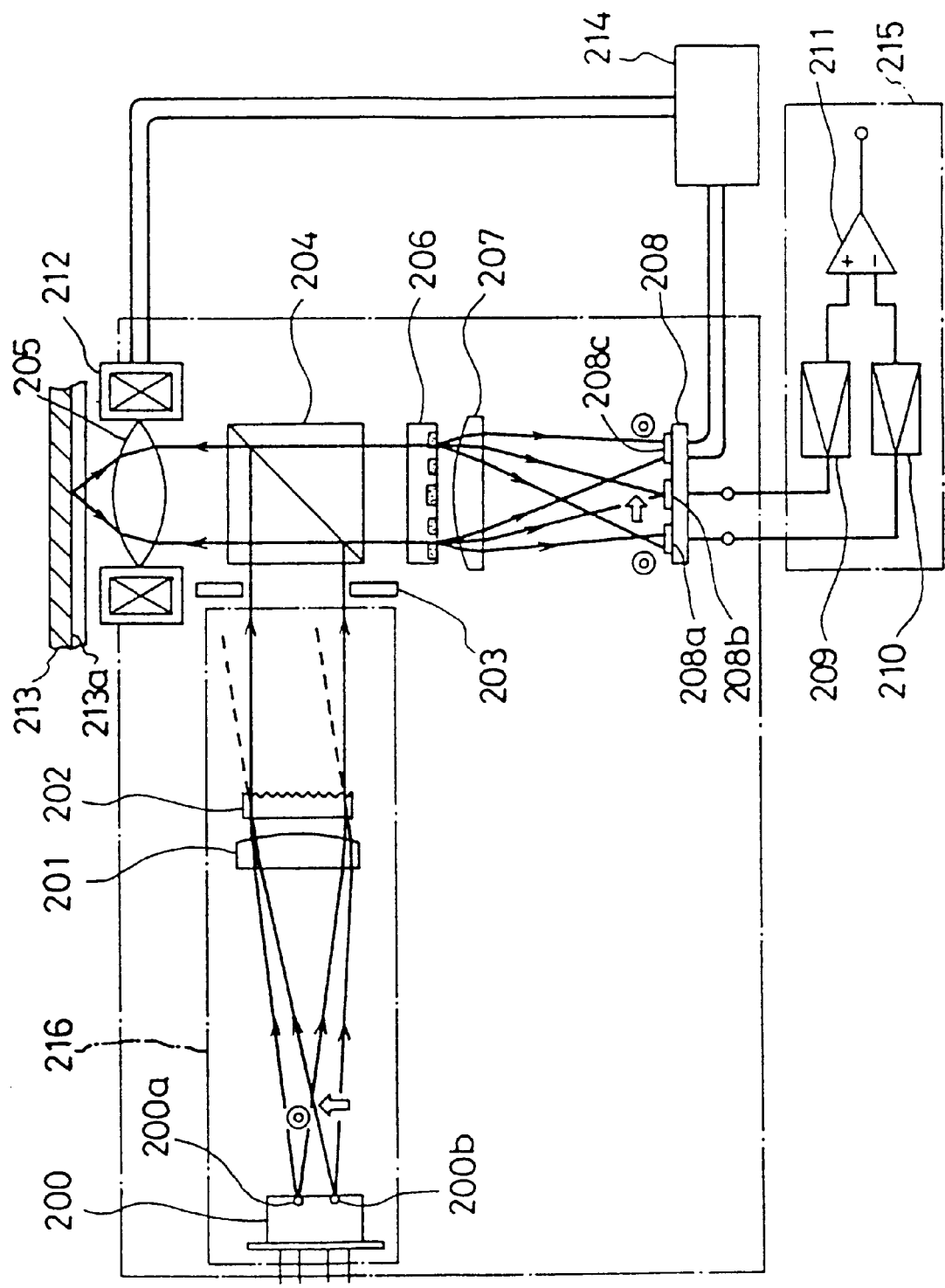
FIG. 4 is a schematic view showing the structure of a super-resolution optical head apparatus according to a second embodiment of the present invention.

FIG. 4 schematically shows the structure of a super-resolution optical head apparatus according to a second embodiment of the present invention.

As shown in FIG. 4, a coherent light source 200 composed of a semiconductor laser comprises two light sources 200a and 200b having planes of polarization perpendicular (orthogonal) to each other. Light beams emitted from the two light sources 200a and 200b sequentially reach a collimator lens 201 and a holographic optical element 202. Each of the two light beams is divided by the holographic optical element 202 into a primary beam and a subsidiary beam having optical axes coincident with each other and having planes of polarization perpendicular to each other. The resulting primary beam and subsidiary beam have their directions changed by a beam splitter 204 and are then focused on an information storage surface 213a of an optical disk 213, in which information is stored in the form of pits, by an objective lens 205. The primary beam and subsidiary beam reflected from the information storage surface 213a are turned into parallel beams again by the objective lens 205 and travel through the beam splitter 204. Thereafter, the primary beam is diffracted by a polarizing holographic optical element 206 and focused by a condenser lens 207 so as to reach a first optical detector 208a and a third optical detector 208c. On the other hand, the subsidiary beam is also focused by the condenser lens 207 so as to reach a second optical detector 208b.

Electric signals outputted from the first and third optical detectors 208a and 208c are synthesized and then amplified by a first amplifier 209, while an electric signal outputted from the second optical detector 208b is amplified by a second amplifier 210. Output signals from the first and second amplifiers 209 and 210 are calculated by a differential calculator 211.

In FIG. 4, a reference numeral 212 designates an electromagnetic driving means (voice-coil-type actuator), 214 designates a control unit having a driving unit for driving a processing unit 215 and an electromagnetic driving means 212, and 216 designates a beam-shaping optical-system unit for forming the primary beam and the subsidiary beam easily and steadily.

The holographic optical element 202 can be obtained by irradiating any one of the polarizing phase plates (or normal phase plates) 104 described above with reference to FIGS. 9 and 10 with a coherent beam in specified size, collimating the transmitted beam, and superimposing the above coherent beam and a reference beam, which can interfere with the coherent beam, upon each other. In the process of fabricating the holographic optical element 202, the same effect can be obtained if the above-non-polarizing phase plate 104 is used instead.

A description will be given to the above holographic optical element 202 with reference to FIG. 3.

The polarizing phase plate 104 and two points 170 and 171 (in effect, slits with fine apertures) are irradiated with parallel coherent beams at a wavelength of $\lambda$, thereby introducing a reference beam 176 onto the focal plane ($\xi$-axis) of the Fourier transform lens (convex lens) 150 so as to record an interference pattern on a photosensitive material. Since the holographic technique for recording a diffracted wavefront from a given object by superimposing an independent coherent reference beam upon each other has been well-known, the detailed description thereof is omitted here. Although a hologram is recorded using the wavelength $\lambda$. the incident angle $\theta$ of the reference beam, and a lens focal distance $f_1$ here, it is also possible to use another wavelength $\lambda_0$ and another lens focal distance $f_0$. The incident angle $\theta_0$ of the reference beam is set to satisfy $\sin\theta_0/\sin\theta=\lambda_0/\lambda$ and the focal distance of the second collimator lens 201 shown in FIG. 4 is set to satisfy $f_1=f_0\cdot\lambda_0/\lambda$. The parameters of a holographic recording/reproducing optical system can also be set otherwise so as to equivalently obtain the same effect.

Thus, the primary beam and subsidiary beam shown in FIG. 4 are formed on the same axis by constituting the holographic optical element 202, which is equivalent to the polarizing phase plate 104, so that it also functions as a beam splitter. However, it is also possible to alternatively design and fabricate the hologram of the polarizing phase plate 104 by a technology based on computer synthesis. In this case, the polarizing phase plate 104 divided into N regions as described above with reference to FIG. 10 can be calculated advantageously from an ideal model in which N→∞. Based on the calculation result, there can be obtained a relief-type hologram which can be produced as a mask pattern to be used in lithography and which can be duplicated by means of electronic beam drawing or laser beam drawing.

The polarizing holographic optical element 206 is similarly constituted to the polarizing hologram 111 of the first embodiment.

The application of a polarizing holographic optical element of the same type has been disclosed in, e.g., U.S. Pat. No. 5,062,098. On the other hand, another substrate material such as a liquid-crystal device having polarizing anisotropy can also be used.

Among others, the method used in fabricating the polarizing holographic optical elements 111 and 206 according the first and second embodiments described above is particularly advantageous in terms of fabrication accuracy and cost, as will be described below. That is, in the device in which lithium ion $Li^+$ in lithium niobate has been substituted by proton ($H^+$), the refractive index with respect to the extraordinary ray undergoes a large variation ($\Delta n_e$) in the region in which proton substitution has been achieved, as shown in Table 1, so that the device functions as a phase-type diffraction grating having a large diffracting effect with respect to the extraordinary ray.

However, in the region in which proton substitution has been achieved, the refractive index with respect to the ordinary ray also undergoes a slight variation ($\Delta n_o$). Thus, in the diffraction grating in which lithium niobate has been substituted by proton, the refractive index with respect to the extraordinary ray and the refractive index with respect to the ordinary ray undergo simultaneous variations and cannot perform the above function of polarization separation completely, so that it becomes necessary to add any phase compensation. In a conventional method (A. Ohba et al., Jap. Appl. Phys., 28 (1989) 359). the phase difference in the ordinary ray has been compensated by a dielectric film formed in the proton substitution region. Accordingly, additional steps of depositing and patterning the dielectric are required in fabricating the diffraction grating, while an improved accuracy is required in alignment.

The polarizing holographic optical element (polarization separating element) 111 diagrammatically shown in FIG. 7 is formed as a holographic optical element with polarizing anisotropy in which proton substitution regions 111a are formed in a grid on the surface of a substrate (X plate). For phase compensation, only the proton substitution regions 111a are etched (hereinafter referred to as phase compensation trenches), conversely to the prior art, thereby offsetting the phase difference imparted by the proton substitution regions 111a and proton non-substitution regions 111b to the extraordinary beam passing through the proton substitution regions 111a after etching. As a result, the refractive index of the phase compensation trench becomes 1 (=refractive index of air), which is smaller than the refractive index of the substrate (refractive index with respect to ordinary ray:$1-n_o$, refractive index with respect to extraordinary ray:$1-n_e$). Accordingly, while the phase difference imparted to the extraordinary ray is eliminated by offsetting the increment ($\Delta n_e$) in refractive index caused by the proton substitution, the phase difference imparted to the ordinary ray is conversely increased due to the reduction in refractive index caused by the phase compensation trenches in addition to the reduction ($\Delta n_o$) in refractive index caused by the proton substitution. The conditions for diffracting the ordinary ray with the maximum efficiency and not diffracting the extraordinary ray are given by the above equations (9) and (10).

Below, a description will be given to the method of fabricating the polarizing holographic optical element 111.

The polarizing holographic optical element 111 can easily be fabricated using the processes of photolithography and proton substitution, similarly to that for the polarizing phase plate 104 shown in FIG. 11. That is, a Ta film is formed on a substrate made of a crystal of lithium niobate ($LiNbO_3$). which is a uniaxially anisotropic material. Next, the Ta film is patterned by photolithography and dry etching, thereby forming a grid-like proton substitution mask. Subsequently, a heat treatment at a temperature of 260° C. with a pyrophosphoric acid is performed using the proton substitution mask, thereby forming the proton substitution regions each having a depth of 2.38 $\mu$m. Since etching with a hydrofluoric acid selectively proceeds with respect to the proton substitution regions, while it does not proceed with respect to the substrate, the phase compensation trenches composed of the proton substitution regions 111a (see FIG. 7) can be formed without alignment by utilizing the selectivity of the etching. As the depth of the phase compensation trench increases, the phase difference also increases in the ordinary ray, so that the efficiency $\eta_{o1}$ of the first-order diffracted ray of the ordinary ray is increased, while the transmittance $\eta_{oO}$ (efficiency of the zero-order diffracted ray) is reduced. In the extraordinary ray, on the other hand, the increment in refractive index of the proton substitution region 111a is offset by the phase compensation trenches, so that the efficiency $\eta_{e1}$ of the first-order diffracted ray of the extraordinary ray is reduced, while the transmittance is increased. The transmittance $\eta_{eO}$ of the extraordinary ray becomes minimum when the depth of etching is 0.13 μm. The extinction ratio of the transmitted ray (extraordinary ray) is 24 dB, while the extinction ratio of the diffracted ray (ordinary ray) is 17 dB, so that excellent characteristics are obtained.

Thus, with the polarizing holographic optical element 206, the primary beam is detected by the first and third optical detectors 208a and 208c shown in FIG. 4, while the subsidiary beam is detected by the second optical detectors 208b shown in FIG. 4, with excellent extinction ratios. The first optical detector 208a is electrically connected to the third optical detector 208c, so that electrical signals are added up, similarly to the first embodiment. The output signals from the first to third optical detectors 208a to 208c are transmitted to a control unit 214 comprising the processing unit and the actuator driving unit, thereby controlling the electromagnetic driving means 212.

(Third Embodiment)

Figure 5:
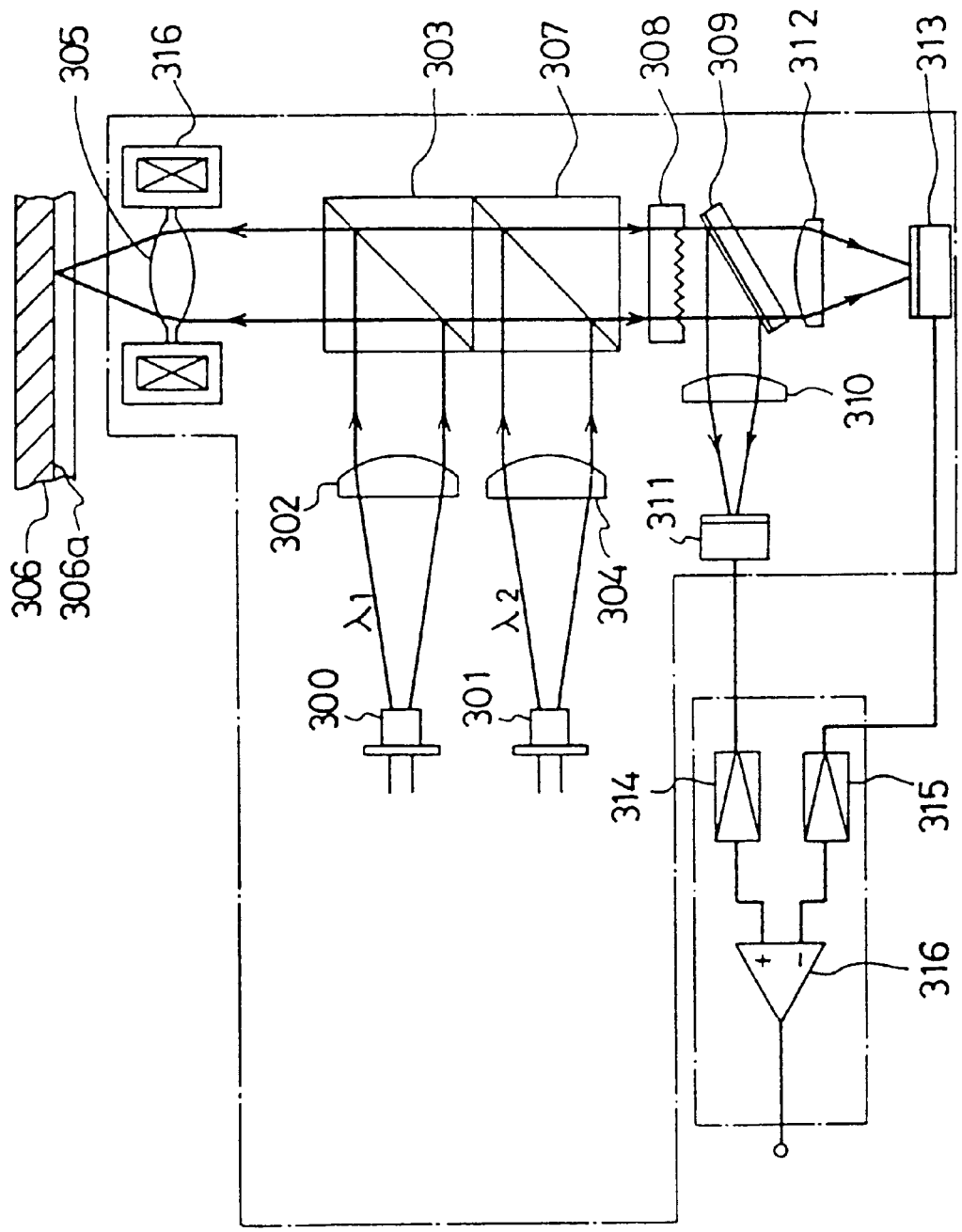
FIG. 5 is a schematic view showing the structure of a super-resolution optical head apparatus according to a third embodiment of the present invention.

FIG. 5 schematically shows the structure of a super-resolution optical head apparatus according to a third embodiment of the present invention.

Unlike the first and second embodiments, the third embodiment uses, as the light source, first and second coherent light sources 301 and 302 for emitting coherent beams at wavelengths slightly different from each other. In addition to that, the third embodiment also uses, as the means for separating the primary beam and the subsidiary beam, a multilayer interference filter 309, which is a wavelength-separation optical system.

As shown in FIG. 5, the primary beam composed of a first coherent beam at a wavelength of $\lambda_1$ is emitted from a first coherent light source 300. After sequentially passing through a first collimator lens 302 having an aperture (not shown) and a first beam splitter 303, the primary beam reaches an objective lens 305 and is focused onto an information storage surface 306a of an optical disk 306. On the other hand, the subsidiary beam composed of a second coherent beam at a wavelength of $\lambda_2=\lambda_1+\Delta\lambda$, which is slightly different from the wavelength $\lambda_1$ of the first coherent beam, is emitted from a second coherent light source 301 integrally formed with a phase plate. The subsidiary beam is turned into parallel beams by a second collimator lens 304 and then reflected by a second beam splitter 307. Thereafter, the reflected parallel beams are transmitted by the first beam splitter 303 and focused on the information storage surface 306a of the optical disk 306 by the objective lens 305. The primary beam and the subsidiary beam are superimposed upon each other on the information storage surface 306a of the optical disk 306 and reflected thereby. Subsequently, the reflected beam is diffracted by a holographic optical element 308 for detecting the focusing error signal and tracking error signal and reaches the multilayer interference filter 309 for wavelength separation. After that, in accordance with the bandpass characteristic of the multilayer interference filter 309, the primary beam is reflected by the multilayer interference filter 309 and reaches a first optical detector 311 via the objective lens 310, while the subsidiary beam sequentially passes through the multilayer interference filter 309 and objective lens 312 and reaches a second optical detector 313. An electric signal outputted from the first optical detector 311 is amplified by a first amplifier 314, while an electric signal outputted from the second optical detector 313 is amplified by the second amplifier 315. Output signals from the first amplifier 314 and from the second amplifier 315 are calculated by a differential calculator 316 and outputted as a super-resolution scanning signal from the differential calculator 316. As for a mechanism for outputting a control signal to an electromagnetic driving means 316, it is the same as the mechanism used in the first and second embodiments, though the drawing thereof is omitted here.

Figure 12:
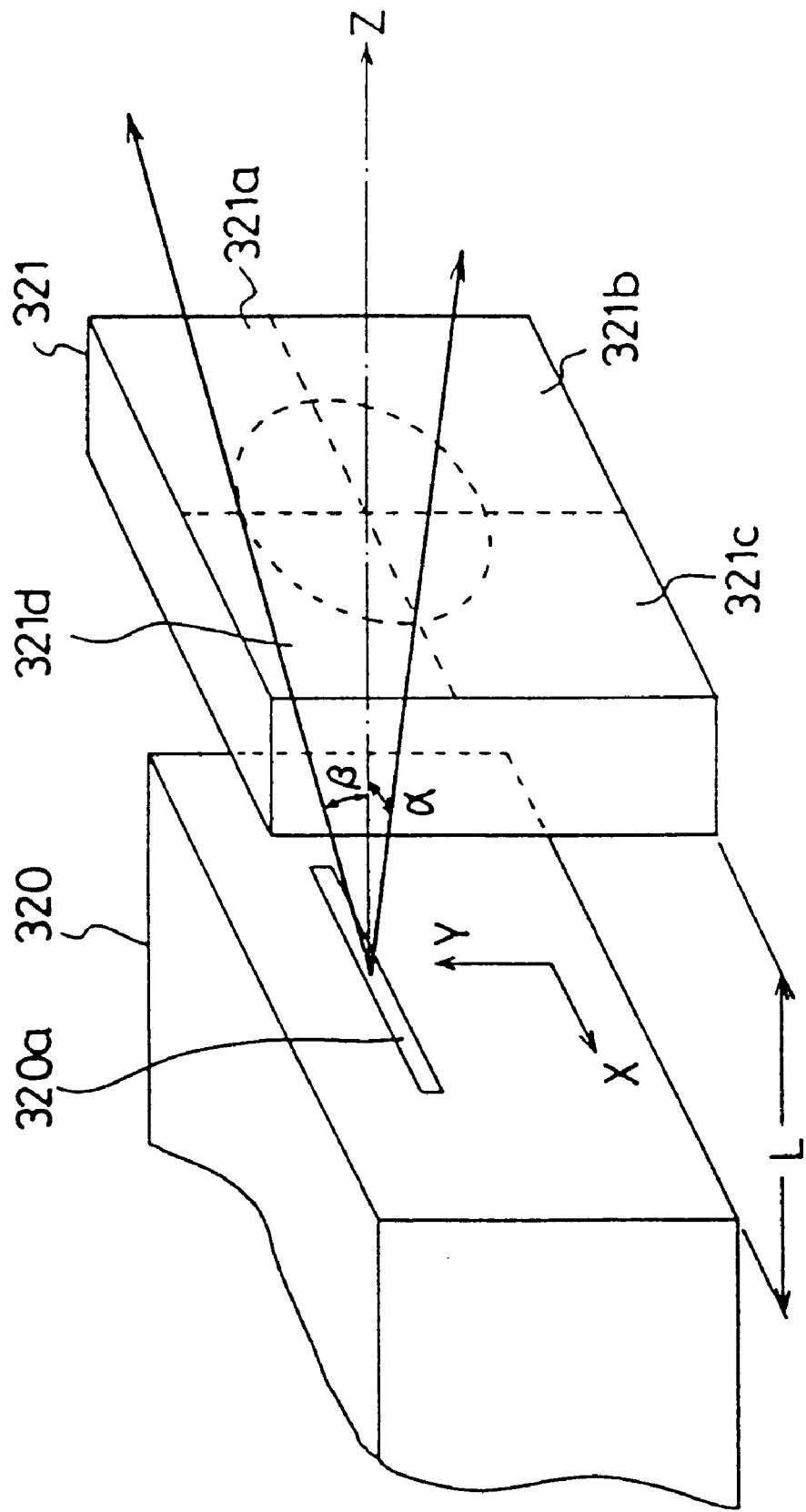
FIG. 12 is a view for illustrating an example of the structures of a light source for generating the subsidiary beam and of the phase plate in the third embodiment of the present invention.
Figure 13:
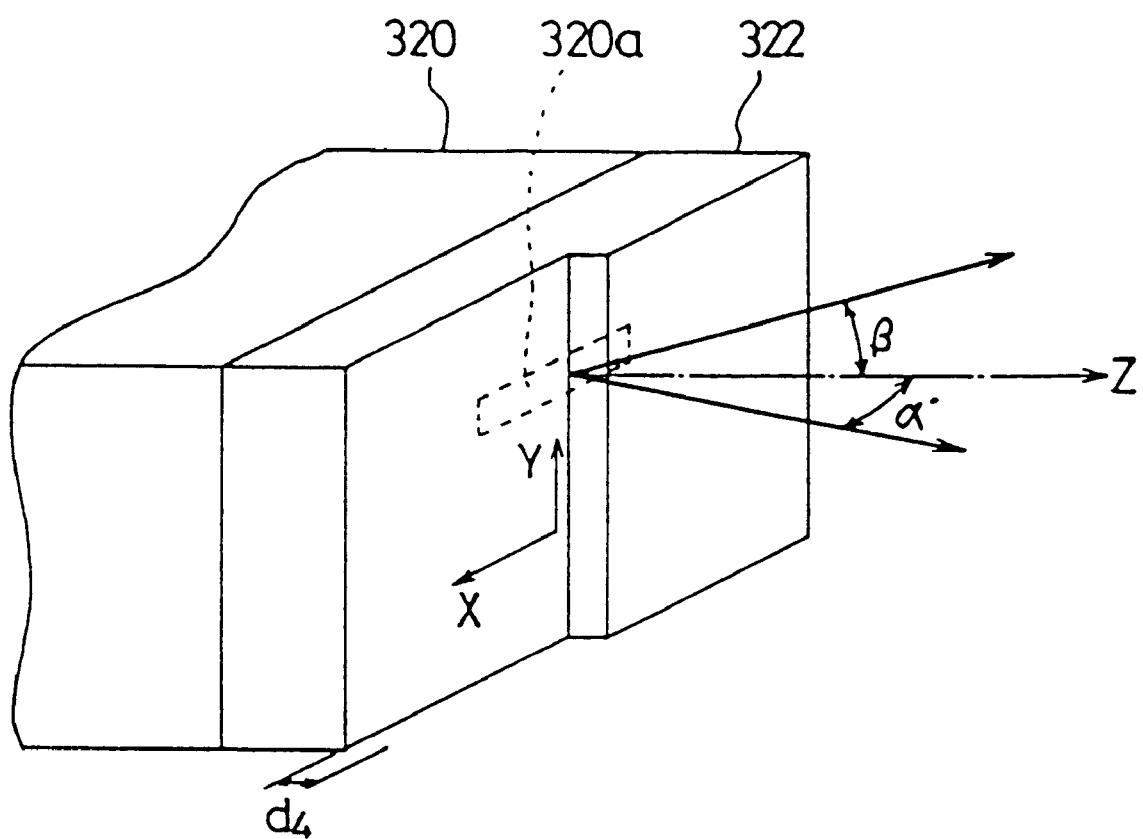
FIG. 13 is a view for illustrating another example of the structures of the light source for generating the subsidiary beam and of the phase plate in the third embodiment of the present invention.

The second coherent light source 301 may be integrally formed with a phase plate 321 (having four phase regions 321a to 321d) which Is positioned close to an active-layer output end 320a serving as the beam emitting surface of the semiconductor laser 320, as shown in FIG. 12, or with a phase plate 322 which is in direct contact with the semiconductor laser 320, as shown in FIG. 13.

As a variation of the third embodiment, it is also possible to constitute an optical system based on the principle of polarization separation, not on the principle of wavelength separation. In this case, light beams having planes of polarization perpendicular (orthogonal) to each other are emitted from the first and second coherent light sources 300 and 301 and a polarizing beam splitter is used instead of the multilayer interference filter 309. As the holographic optical element 308, the polarizing holographic optical elements 111 and 206 as used in the first and second embodiments can be used.

(Fourth Embodiment)

Figure 6:
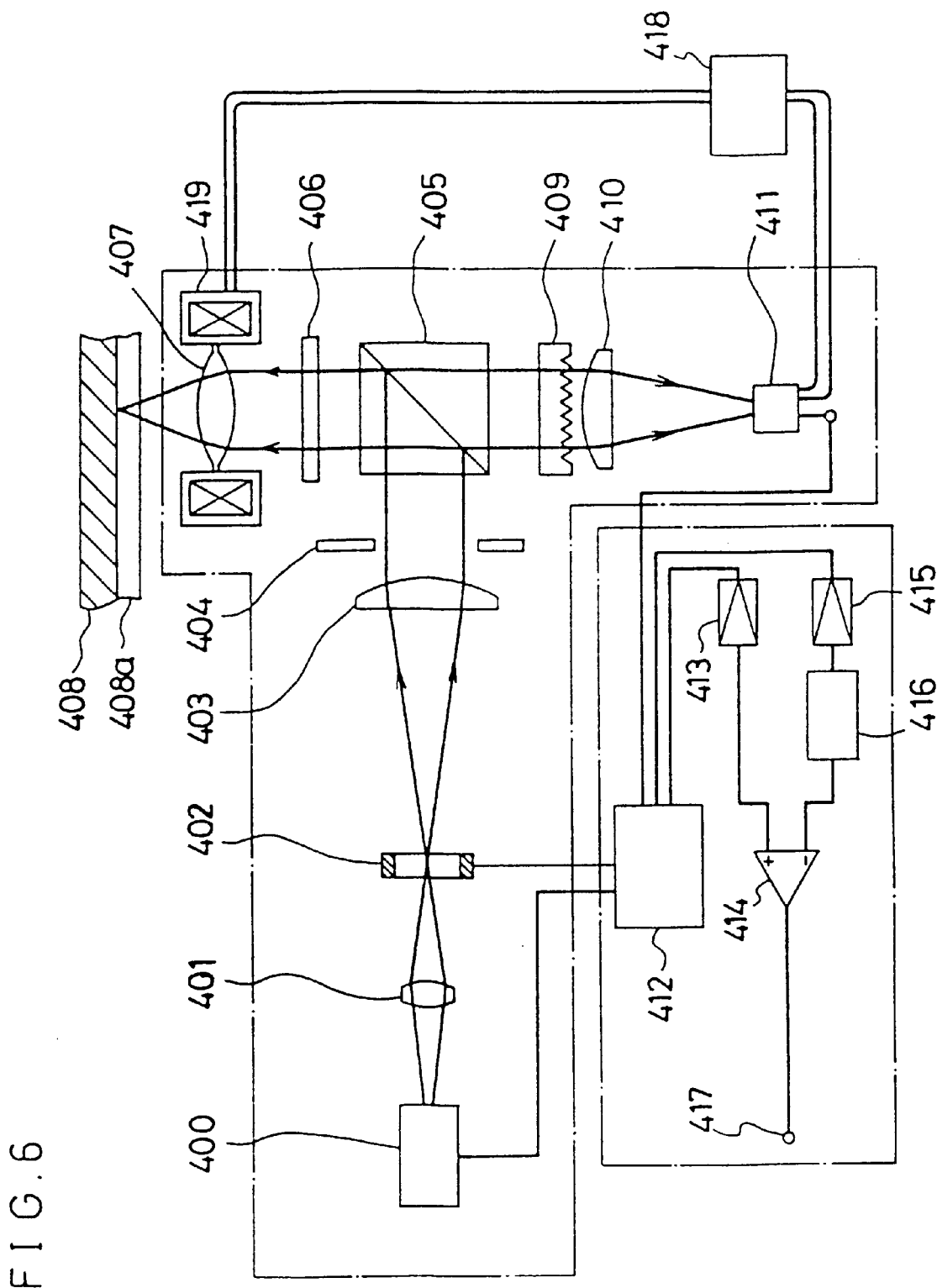
FIG. 6 is a schematic view showing the structure of a super-resolution optical head apparatus according to a fourth embodiment of the present invention.

FIG. 6 schematically shows the structure of a super-resolution optical head apparatus according to a fourth embodiment of the present invention.

The fourth embodiment uses a time separation system as a method of detecting signals in the primary beam and subsidiary beam.

As shown in FIG. 6, a linearly polarized light beam in pulsed form is emitted from a coherent light source 400 and subjected to pulse modulation. The light beam is then beam-shaped by a condenser lens 401 and reaches a phase modulator 402. Thereafter, the light beam sequentially passes through a collimator lens 403, an aperture 404, a polarizing beam splitter 405, and a quarter-wave plate 406 and is focused on an information storage surface 408a of an optical disk 408 by an objective lens 407. The beam in pulsed form reflected by the information storage surface 108 a passes through the quarter-wave plate 406, polarizing beam splitter 405, holographic optical element 409, and condenser lens 410 again and reaches an optical detector 411. A first control unit 412 drives the coherent light source 400 and the phase modulator 402 in synchronization, while controlling the main beam and subsidiary beam such that they alternately reach the information storage surface 408a of the optical disk 408 and are reflected thereby.

The primary beam in pulse form incident upon the optical detector 411 is inputted to a differential calculator 414 via a first amplifier 413, while the subsidiary beam in pulse form is inputted to the differential calculator 414 via a second amplifier 415 and a delay element 416. From the differential calculator 414 is outputted the super-resolution signal via an output terminal 417. The delay element 416 is for adjusting a pulse interval t between the primary beam and the subsidiary beam.

The focusing error signal and tracking error signal diffracted by the holographic optical element 409 are received by the optical detector 411 and transmitted, as a servo signal, to a second control unit 418, similarly to the first embodiment. The second control unit 418 drives an electromagnetic driving means 419 based on the above serve signal.

Figure 14:
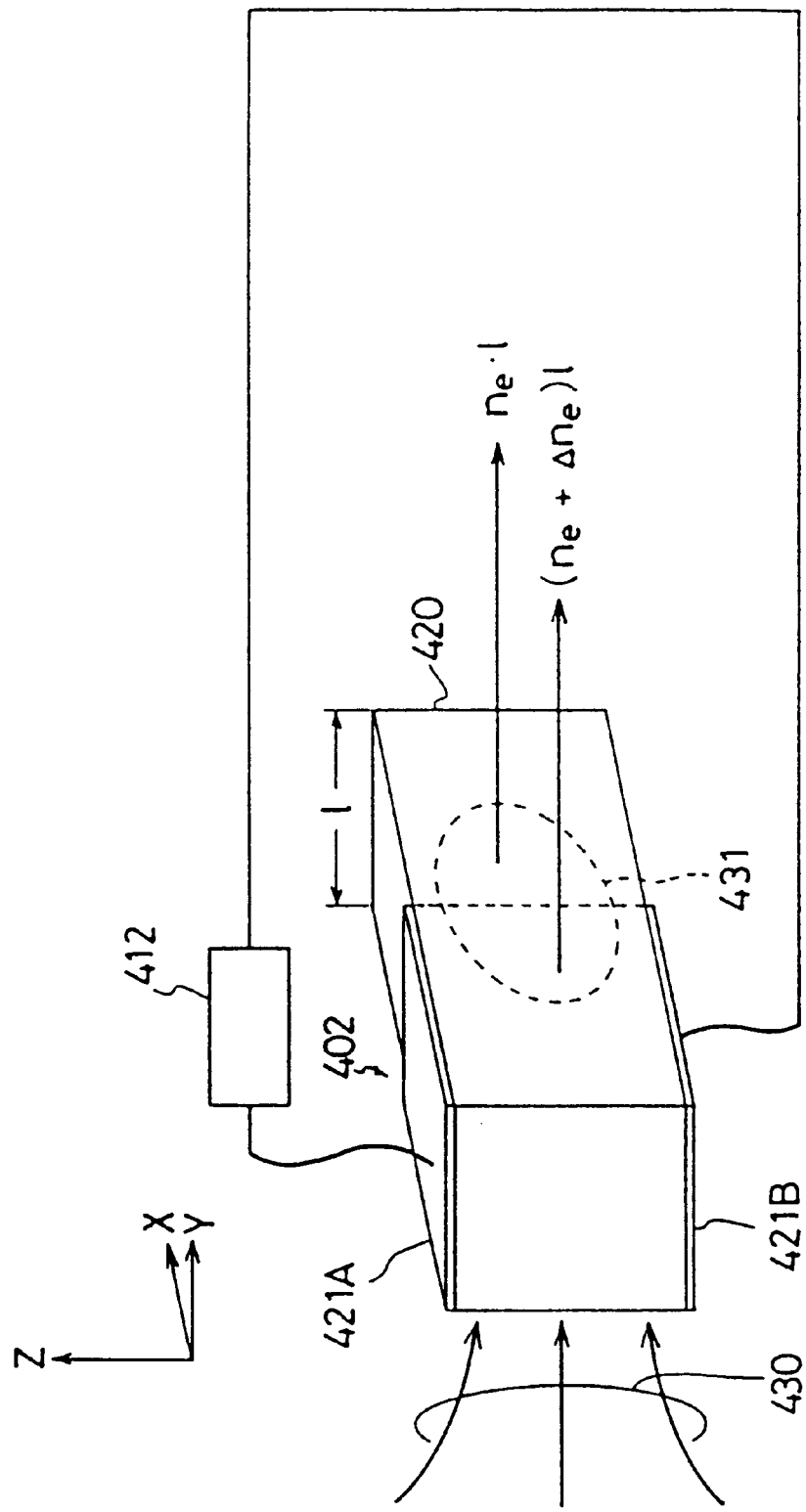
FIG. 14 is a view for illustrating an example of the structure of a phase modulator in the fourth embodiment of the present invention.

In the phase modulator 402, a ferroelectric crystal 420 composed of a crystal of lithium niobate or PLZT is sandwiched between upper and lower electrodes 421A and 421B aligned in the direction of the Z-axis, as shown in FIG. 14. The upper and lower electrodes 421A and 421B are connected to a voltage-applying power source that has been incorporated into the first control unit 412. As shown in FIG. 14, the voltage is applied so as to generate a beam 431 having an optical path difference of $\Delta n_e \times 1$ with a half portion of a linearly polarized beam 430 incident upon the phase modulator 402:

$$\Delta n_e = (1/2) \times N^3 \times E \gamma_{33} \tag{11}$$

$$\Delta n_e \times 1 = \lambda_2 / 2 \tag{12}$$

where the required electric field E is approximately $2 \times 10^5$ v/m=200 v/mn, if the electro-optic coefficient $\gamma_{33}$ is approximately $30 \times 10^{-12}$ m/v, $\lambda_2$ is approximately $0.4 \times 10^{-6}$ m, L is $10^{-2}$ m, and N is approximately 2 (refractive index).

Figure 15A:
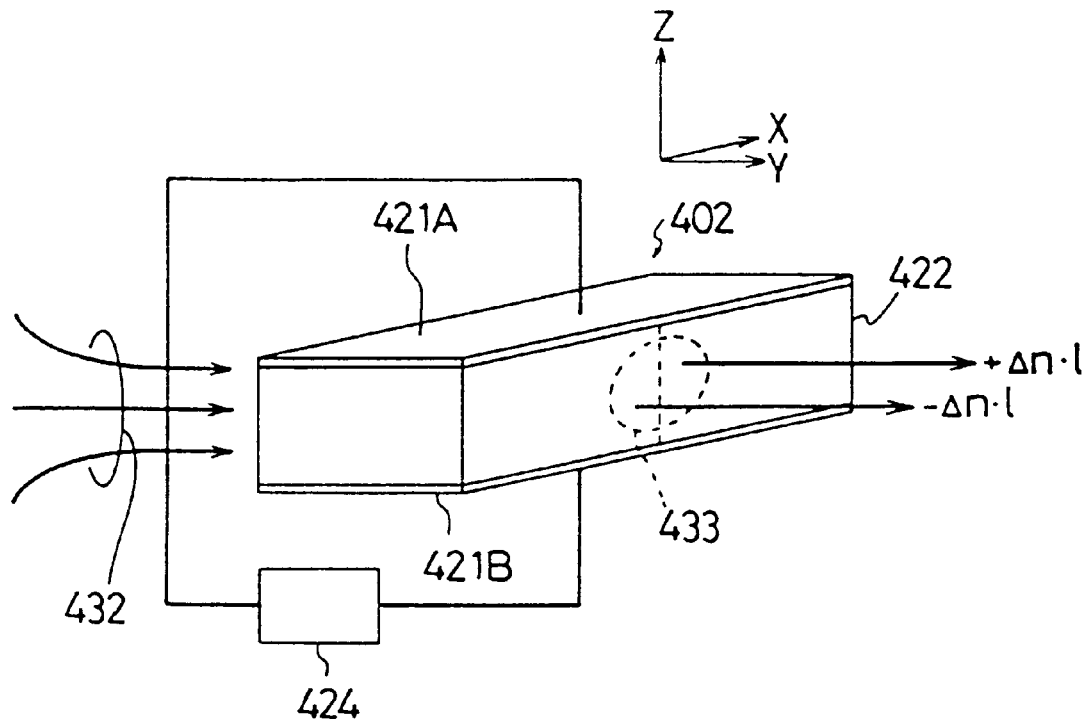
FIGS. 15(a) and 15(b) are views for illustrating another example of the structure of the phase modulator in the fourth embodiment of the present invention.
Figure 15B:
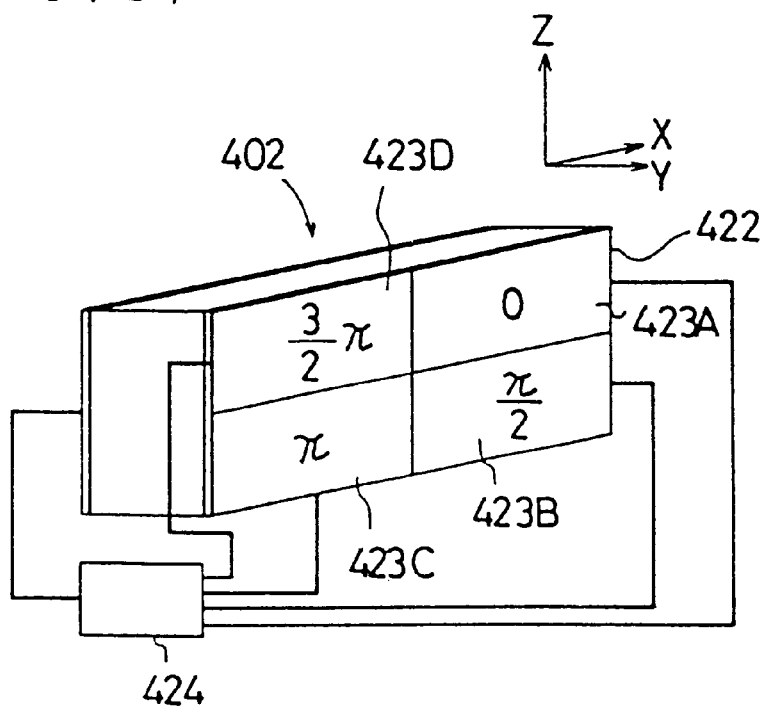

FIG. 15(a) schematically shows the structure of the phase modulator 402 with inverted polarization formed by applying a high electric field of about 20 kv to a ferroelectric crystal 422 (corresponding to the upper half of the ferroelectric crystal 420 shown in FIG. 14) via the upper and lower electrodes 421A and 421V. The application of the voltage has produced a phase difference of $\pm \Delta n33\ 1$ in a linearly polarized beam 432 incident upon the phase modulator 402, so that an optical path difference equivalent to that obtained with the phase modulator 402 shown in FIG. 14 can be produced by applying a voltage half the voltage applied to the phase modulator 402. If the two-dimensional phase regions as shown in FIGS. 9(b) and 10(a) are to be formed, two phase modulators 402 as shown in FIG. 14 or 15 (a) are placed crosswise at right angles (by rotating one phase modulator in the X-Z plane) or transparent electrodes 423A to 423D as shown in FIG. 15(b) are formed on a beam receiving surface or on a beam emitting surface, so that a voltage is applied thereto. In FIGS. 15(a) and 15(b), 424 designates a power-source unit for applying a voltage to the phase modulator 402.

(Fifth Embodiment)

Figure 16:
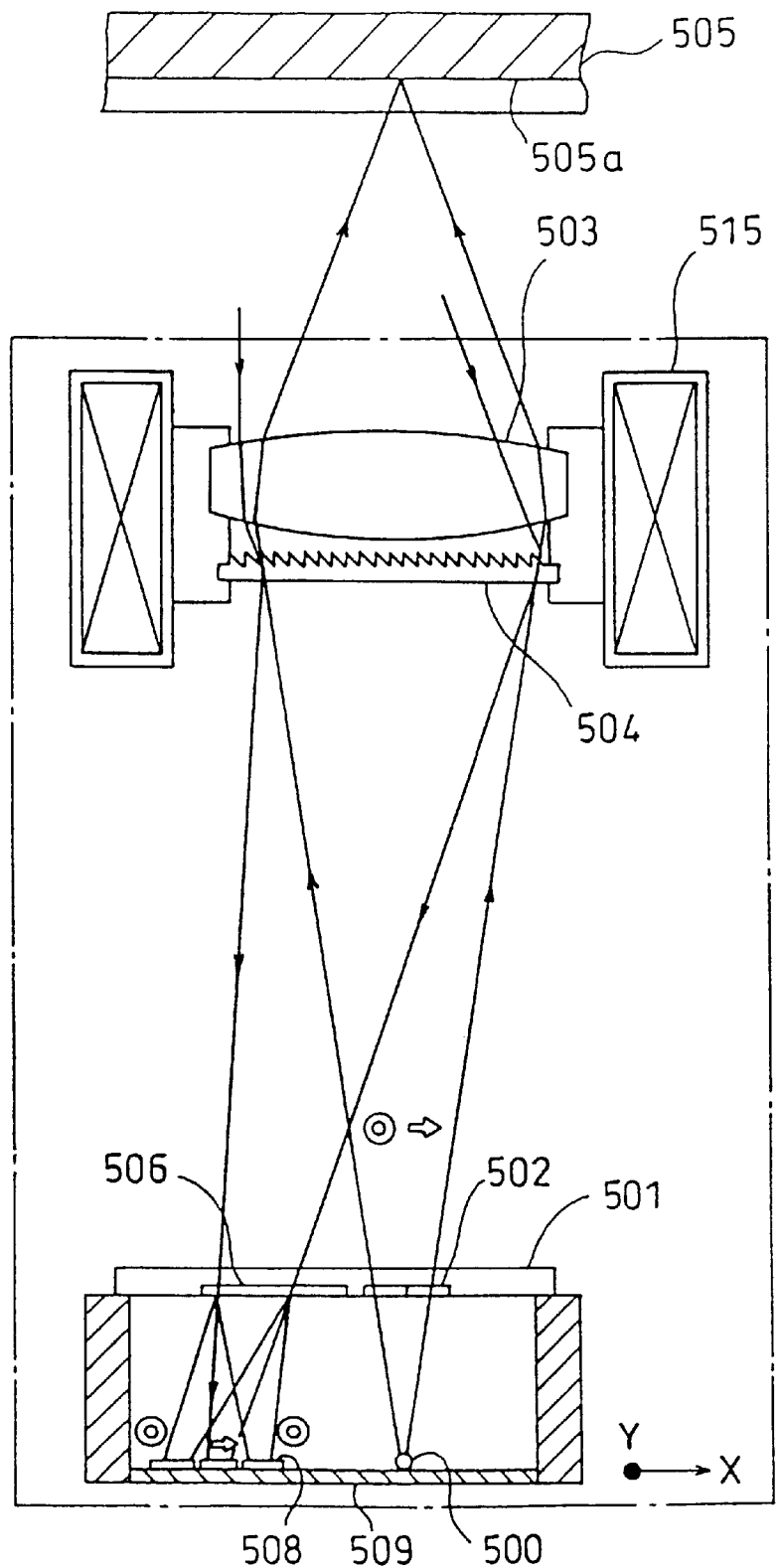
FIG. 16 is a schematic view showing the structure of a super-resolution optical head apparatus according to a fifth embodiment of the present invention.

FIG. 16 schematically shows the structure of a super-resolution optical head apparatus according to a fifth embodiment of the present invention.

To constitute a simple optical system of go-and-return (or round trip) type, the fifth embodiment uses, as the focusing means, an objective lens formed integrally with a holographic optical element, thereby implementing a compact super-resolution optical head.

As shown in FIG. 16, a coherent beam in an outward trip is emitted from a coherent light source 500 and passes through a polarizing phase plate 502 divided into four regions (0, $\pi/2$, $\pi$, and $3\pi/2$), which has been formed on a substrate 501 having a uniaxially anisotropic refractive index, thereby forming the primary beam (→) and the subsidiary beam (◎) having planes of polarization perpendicular to each other. The resulting primary and subsidiary beams pass through a holographic optical element 504 provided integrally with an objective lens 503. The zero-order transmitted beams from the holographic optical element 504 are superimposed upon each other and focused onto an information storage surface 505a. It is to be noted that the intensity profile of the subsidiary beam may be slightly different from those at the foregoing embodiments since appreciable distance is given between the light source 500 and the phase plate 502. However, the distance is still small compared with the distance between the light source 500 and the objective lens 503, so that super-resolution effect as well as cross-talk cancelling effect of the present invention can also be available. In the present embodiment, the tracking direction of the optical disk 505 corresponds to the Y direction which is perpendicular to the paper face. The reflected beam from the information storage surface 505a passes through the objective lens 503 and the holographic optical element 504 in a return trip. The first-order diffracted beam from the holographic optical element 504 travels off the optical axis of the objective lens 503 and reaches a polarizing diffraction grating 506 formed in a region adjacent to the polarizing phase plate 502 of the substrate 501, which is shown in FIG. 17(b). The beam incident upon the polarizing diffraction grating 506 is separated thereby into the primary beam and the subsidiary beam through polarization separation and then detected by an optical detector 508 shown in FIG. 17(a). FIG. 17(c) shows the respective intensity distributions of the primary and subsidiary beams on the information storage surface 505a.

Below, a detailed description will be given to the function of the holographic optical element 504 and to a method of detecting a super-resolution scanning signal by means of the optical detector 508.

Figure 18A:
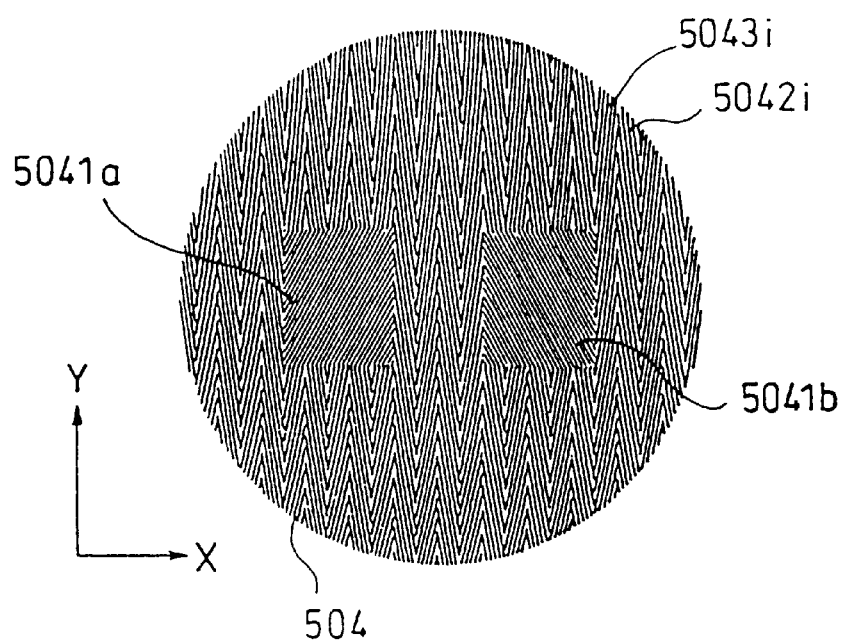
FIG. 18(a) is a view diagrammatically showing an example of the pattern of a holographic optical element in the fifth embodiment of the present invention.

The holographic optical element 504 has multiple functions of: separating, as a beam splitter, the light beam in the return trip from the light beam in the outward trip by diffracting it off the optical axis of the objective lens 503; forming an optical beam for obtaining a focusing servo signal and a tracking servo signal from the beams obtained as a result of separation; and detecting an RF signal. Although the servo-signal detecting system can be implemented using various systems, the fifth embodiment obtains the focusing error signal and the tracking error signal by spot size detection (SSD) method and by a pushpull (PP) method, respectively. Although the SSD method is disclosed in Japanese Laid-Open Patent Publication No. 62-251025, the holographic optical element 504 in the fifth embodiment is constituted by two Fresnel zone plates of divided-region type with one region of a stripe form placed adjacent to the other as in a sampled pattern, suitably for integral formation with the objective lens 503. Such a Fresnel zone plate of divided-region type is detailed as a blazed hologram in a document (Makoto Kato et al.; "Recent advances in optical pickup head with holographic optical elements," Proc. SPIE, vol. 1507, pp. 36–44., European Congress on Optics, Holographic Optics III: Principles and Applications, 12–15 Mar. 1991. The Hague, The Netherlands). FIG. 18(a) diagrammatically shows the pattern of the holographic optical element 504 constituted by the two Fresnel zone plates with one plate placed upon the other, which is detailed in the foregoing document. In regions 5042i (i=1, 2, 3, ...) and 5043i (i=1, 2, 3, ...) is shown a pattern shaped like a Fresnel zone plate, which is not overlapped and is sampled in stripes. In FIG. 18(a), 5041a and 5041b designate hologram regions provided in order to detect the tracking signal.

Although the holographic optical element 504 is in a position closer to the coherent light source 500 and the objective lens 503 is in a position closer to the optical disk 505 in the fifth embodiment, their positions may be interchanged with each other.

Figure 17A:
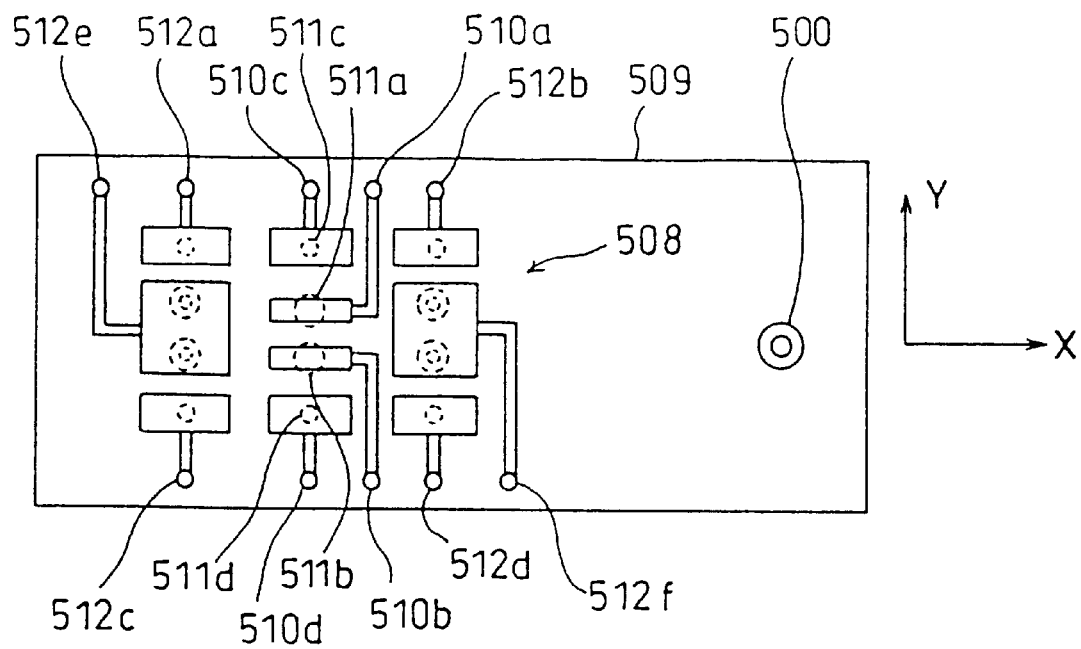
FIG. 17(a) is a plan view showing a coherent light source and an optical detector formed on the same substrate in the fifth embodiment.
Figure 17B:
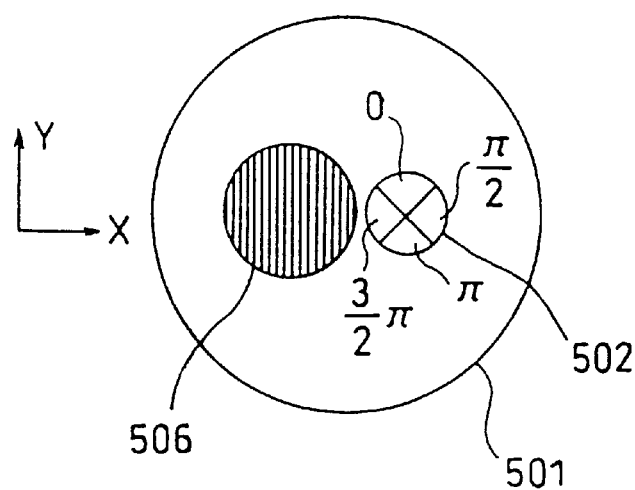
FIG. 17(b) is a plan view showing a polarizing phase plate and a polarizing diffractive grating formed on the same substrate in the fifth embodiment.
Figure 17C:
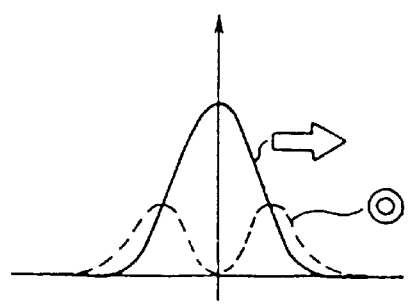
FIG. 17(c) is a view showing the intensity distribution of a primary beam and the intensity distribution of a subsidiary beam in the fifth embodiment.

As shown in FIG. 17(a), on a substrate 509 on which the coherent light source 500 and an optical detector 508 are integrated are provided element terminals 510a and 510b for detecting a focusing error signal using the SSD method. The focusing error signal is detected by the element terminals 510*a* and 510*b* as a pair of light beams 511*a* and 511*b* formed from the primary beam. On the other hand, the tracking error signal is detected by element terminals 510*c* and 510*d* as a pair of light beams 511*c* and 511*d*.

The subsidiary beam is separated by the polarizing diffraction grating 506 as a ±first-order diffracted beam and detected, on both sides of the primary beam, by the element terminals 512*a*, 512*b*, 512*c*, and 512*d* and by element terminals 512*e* and 512*f*. The super-resolution scanning signal is obtained, as the RF signal, by subtracting the sum of the output signals from the element terminals 512*a*, 512*b*, 512*c*, 512*d*, 512*e*, and 512*f* from the sum of the output signals from the element terminals 510*a*, 510*b*, 510*c*, and 510*d*. However, a method of optimizing the calculations using proper amplifiers will not be described in greater detail, since it is a designing issue.

Although the polarizing phase plate 502 has been divided into four regions in the fifth embodiment, it will easily be appreciated that the number of regions into which the polarizing plate is divided may be other than four. As for the manufacturing process of the polarizing phase plate 502, it will not be mentioned here, since it has been described in detail together with the polarizing diffraction grating.

Figure 18B:
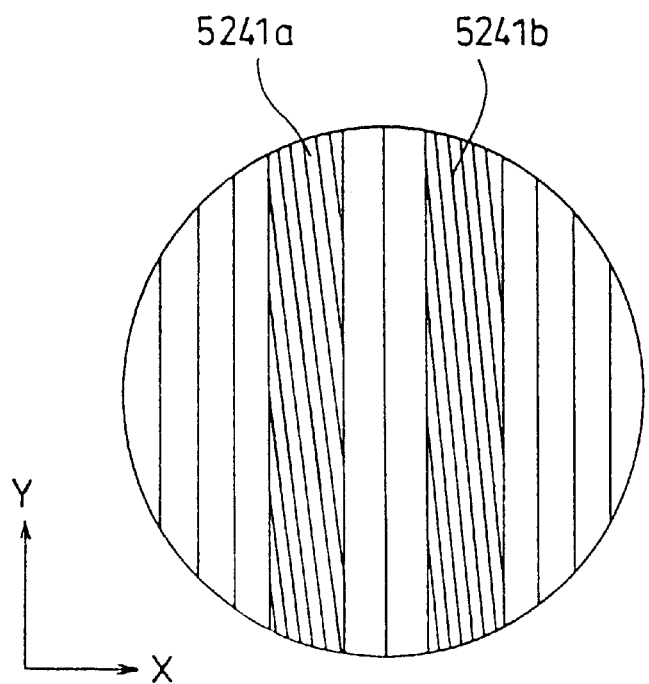
FIG. 18(b) is a view diagrammatically showing another example of the pattern of the above holographic optical element.
Figure 19:
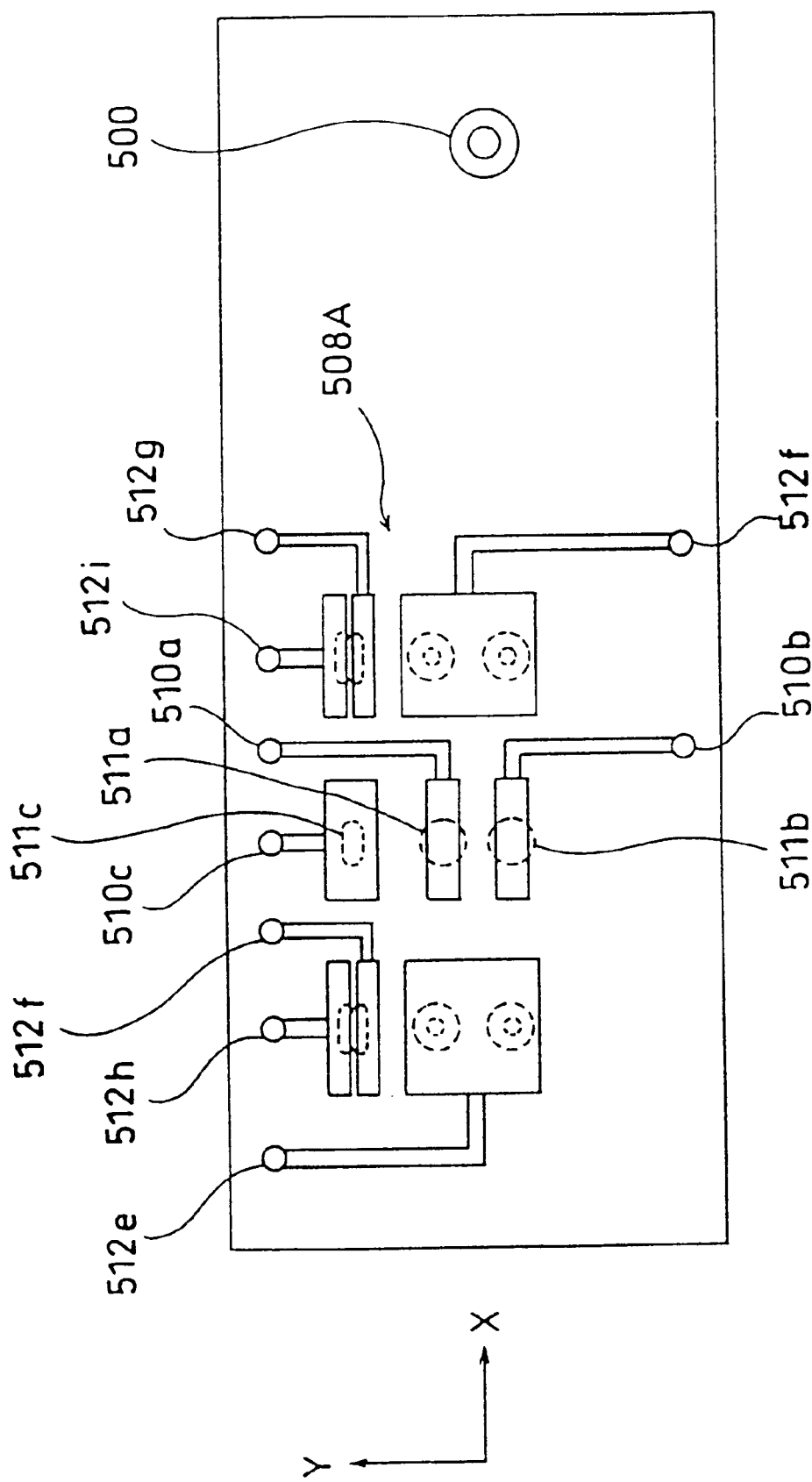
FIG. 19 is a view showing an optical detector when another example of the pattern of the holographic optical element is used in the fifth embodiment of the present invention.
Figure 20B:
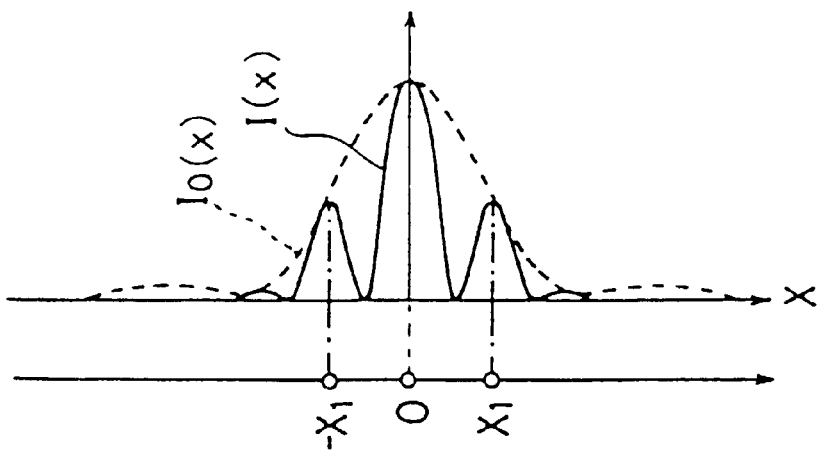
FIG. 20 is a schematic view for illustrating the structure of a conventional super-resolution optical system using an annular diaphragm.
Figure 20A:
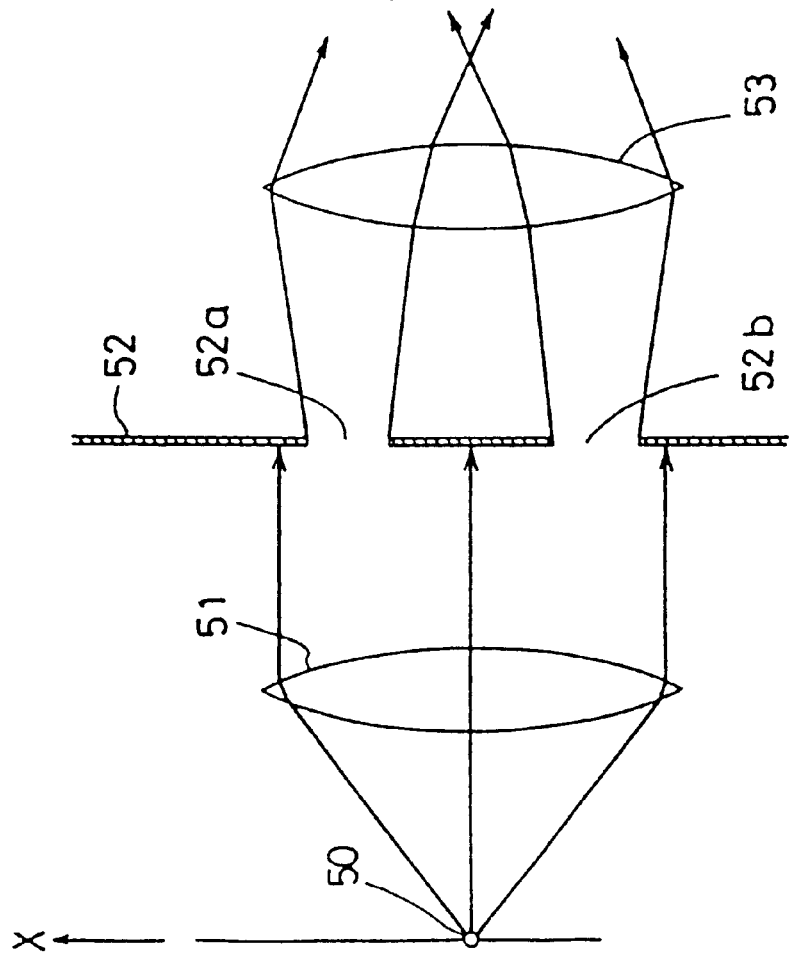

As the method of detecting the tracking error signal, a phase difference method, a three-beam method, or the like can be adapted to the holographic optical element 504 of the super-resolution optical head apparatus according to the fifth embodiment. FIG. 18(*b*) shows another example of the above holographic optical element 504. As shown in FIG. 18(*b*), the holographic optical element according to another example has hologram regions 5241*a* and 5251*b* with grooves extending transversely in the Y direction. The primary beam and subsidiary beam reflected from the information storage surface 505*a* of the optical disk 505 are focused by the hologram regions 5241*a* and 5241*b* onto an optical detector 508A shown in FIG. 19. The optical detector 508A detects the tracking error signal from the subsidiary beam focused by the hologram regions 5241*a* and 5241*b*. The subsidiary beam focused on the optical detector 508A is received by a two-part optical detector composed of a pair of right and left detecting elements and then outputted from element terminals 512*h* and 512*f* and from element terminals 512*i* and 512*g*. The outputs from the element terminals 512*h* and 512*f* are differentially calculated, while the outputs from the element terminals 512*i* and 512*g* are also differentially calculated. Thereafter, the sum of the respective differences are calculated and detected as the tracking error signal. Although the method is similar to the conventional three-beam method in which two beams are allowed to travel along the tracks in respective positions anterior and posterior to the primary beam for detecting the RF signal, the quantities of light of the two beams are detected in their respective image forming positions, and differential calculations are performed afterward, the method of the present embodiment is different from the conventional three-beam method in that it obtains the tracking error signal by halving an image of the subsidiary beam that has been overlaid on the same optical axis on which the primary beam has been overlaid. In other words, since the method of the present embodiment obtains the tracking error signal by halving the image of the subsidiary beam overlaid on the same optical axis on which the primary beam has been overlaid, it is excellently stable as well as advantageous in terms of adjustment accuracy. Since the longitudinal directions of the hologram regions 5241*a* and 5241*b* for detecting the tracking signal correspond to the Y direction perpendicular to the tracking direction (X) in the present embodiment, the expansion of the subsidiary beam expands in the Y direction on the optical detector 508A is confined within the range of the expansion of the diffraction limited of the object lens, so that a precise tracking error signal is obtained.

With the super-resolution optical head apparatus according to the fifth embodiment, the following effects can be obtained. Specifically, since the optical system of go-and-return type is constructed, an optical head apparatus of a compact and simple super-resolution scanning optical system can be implemented. Since the polarizing phase plate 520 and the polarizing diffraction grating 506 are formed on the same substrate 501 close to each other, the apparatus presents excellent stability. Since the coherent light source 500 and the optical detector 508 are integrated on the same substrate 509, the apparatus can easily be assembled and adjusted, while exhibiting remarkable stability to secular changes, temperature changes, and mechanical changes. A technique for providing the coherent light source 500 and the optical detector 508 on the same substrate 509 is well known as the technique for implementing, e.g., a structure in which a light beam is emitted perpendicularly to the substrate 509 by means of an etched mirror integrally formed on a silicon substrate and a structure in which the optical detector 508 is integrated on the above silicon substrate.

Moreover, in detecting the tracking error signal as a differential signal between an output signal from the element terminal 510*c* and an output signal from the element terminal 510*d* in the fifth embodiment, the tracking error signal can be detected with reliability in high-density recording, which has conventionally been difficult with a normal means, by subtracting the sum of an output signal from the element terminal 512*a* and an output signal from the element terminal 512*b* from the output signal from the element terminal 510*c* at a proper rate and by subtracting the sum of the output signal from the element terminal 512*c* and the output signal from the element terminal 512*d* from an output signal from the element terminal 512*e* at a proper rate.

The servo signal thus obtained is feedbacked to an actuator 515 for driving the objective lens 503 formed integrally with the holographic optical element 504. However, a further description will not be given to the process, since it is a well-known technique.

Although the control means for controlling the focusing means in each of the above embodiments is an electromagnetic driving means, another control means can be used as the control means for focusing and tracking the beam on the surface of the optical disk. For example, as another means for focusing the light beam onto the surface of the optical disk, a piezoelectric actuator or a means utilizing such fluid-dynamic floating power as used in a magnetic disk head. As another means for controlling the tracking of the light beam on the surface of the optical disk, a means for deflecting the light beam using an electric-optic effect can be used.

Since the individual embodiments of the present invention have been described above in detail, there will be easily understood the structure and functions of the super-resolution optical head apparatus of the present invention, which has equivalently achieved a beam size about 70% of the beam size of the diffraction limited in an optical head apparatus using the conventional optical system.

The significant effect achieved by the present invention is that information can be read from a high-density disk having double the density of a conventional disk without increasing the numerical aperture of the objective lens and without changing the light-source wavelength (e.g., NA=0.45, wavelength λ=0.78 μm with an optical head built in a compact disk player). Since the focal depth of the optical head in the compact disk player is generally set to about 1.5 μ/m, focusing can be controlled easily. However, in the case of using an objective lens with an increased numerical aperture (e.g., NA=0.6) and a short-wavelength light source (e.g., λ=0.43 μm), the focal depth is reduced in proportion to the wavelength and in inverse proportion to the square of the numerical aperture, as shown in the following equation:

$$1.5 \,\mu m \times (430/780) \times (0.45/0.60) = 1.5 \,\mu m \times 0.31 \text{ (roughly equal to } 0.47 \,\mu m) \tag{13}$$

Consequently, if the super-resolution optical system of the present invention is used in an optical head apparatus, information can be read from a high-density optical disk, using a short-wavelength light source, by means of a simple and cheap player. As a result, there can be achieved the significant effect that an optical-disk apparatus can easily be implemented with reliability by using a conventional servo-signal detecting technique and a conventional control technique.

In other words, since the differential calculating process is performed with respect to the light intensities of the primary and subsidiary beams according to the present invention, there can be achieved the significant effect of increasing, by twice or more, the focal depth based on the diffraction limited resolution of the objected lens.

The effects of the present invention have been described from the view point of super resolution in a single track. It is, however, also pointed out that the cross-talk cancelling effects in reading the information on the optical disks recorded on multiple track structures, since the equivalent spot size on the disk plane can be reduced to about 70% of the diffraction limited so that cross-talk signals due to the adjacent tracks are greatly suppressed.

As a whole, it is concluded that the signal characteristics can be improved both in the track direction (as a waveform equalizes) and in the cross-track direction (as a cross-talk canceler) according to the present invention described thereof.

We claim:

1. A super-resolution optical head apparatus, comprising:
   a coherent light source for emitting a coherent beam;
   a polarizing phase plate for receiving the coherent beam emitted from said coherent light source, separating said coherent beam into a primary beam and a subsidiary beam which has a plane of polarization perpendicular to a plane of polarization of said primary beam and an intensity distribution in which peak values are placed at least on both sides of a, center of said primary beam and a principal portion thereof is equal, or almost equal, in size to a principal portion of said primary beam, and emitting them;
   a focusing means for superimposing the primary beam and subsidiary beam emitted from said polarizing phase plate upon each other and focusing them onto an information storage surface having an optical information storage carrier;
   a control means for controlling said focusing means such that a light beam composed of said primary beam and said subsidiary beam being superimposed upon each other performs focusing and tracking with respect to the optical information storage carrier of said information storage surface;
   a polarization separating means for receiving the light beam reflected from said information storage surface, separating said light beam into the primary beam and the subsidiary beam through polarization separation, and emitting them;
   an optical detecting means for individually detecting respective intensities of the primary beam and subsidiary beam emitted from said polarization separating means and outputting a light intensity signal; and
   a calculating means for calculating, based on the light intensity signal outputted from said optical detecting means, a super-resolution scanning signal and outputting it.

2. A super-resolution optical head apparatus according to claim 1, wherein
   said polarization separating means comprises a substrate having a uniaxially anisotropic refractive index and a polarizing holographic optical element or a polarizing diffraction grating formed on said substrate.

3. A super-resolution optical head apparatus according to claim 1, wherein
   said polarizing phase plate separates the coherent beam emitted from said coherent light source into an optical beam having a plane of polarization in one direction and an optical beam having a plane of polarization in another direction, said planes of polarization being perpendicular to each other, emits, as said primary beam, said optical beam having the plane of polarization in one direction, has a first region which does not impart any relative phase difference to said optical beam having the plane of polarization in another direction and a second region which imparts a relative phase difference of π to said optical beam having the plane of polarization in another direction, and emits, as said subsidiary beam, the optical beam passing through said first and second regions.

4. A super-resolution optical head apparatus according to claim 3, wherein
   said first and second regions are formed around a center of said polarizing phase plate in four regions so that the two first regions alternate the two second regions.

5. A super-resolution optical head apparatus according two claim 1, wherein
   said polarizing phase plate separates the coherent beam emitted from said coherent light source into an optical beam having a plane of polarization in one direction and an optical beam having a plane of polarization in another direction, said planes of polarization being perpendicular to each other, emits said optical beam having the plane of polarization in one direction without imparting any relative phase difference thereto, has N (N is an integer equal to or more than 2) regions around a center thereof which impart a relative phase difference advancing in the sequence of 0, $2\pi/N$, $(2\pi/N) \times 2$, $(2\pi/N) \times 3$, ..., and $(2\pi/N) \cdot (N-1)$ to said optical beam having the plane of polarization in another direction, and emits, as said subsidiary beam, the optical beam passing through said N regions.

6. A super-resolution optical head apparatus, comprising:
   a coherent light source for emitting a coherent beam;
   a polarizing phase plate for separating the coherent beam emitted from said coherent light source into a primary beam and a subsidiary beam which has a plane of polarization perpendicular to a plane of polarization of said primary beam and an intensity distribution in which peak values are placed at least on both sides of a center of said primary beam and a principal portion thereof is equal, or almost equal, in size to a principal portion of said primary beam and emitting them;

a focusing means for superimposing the primary beam and subsidiary beam emitted from said polarizing phase plate upon each other and focusing them onto an information storage surface having an optical information storage carrier;

a control means for controlling said focusing means such that a light beam composed of said primary beam and said subsidiary beam being superimposed upon each other performs focusing and tracking with respect to the optical information storage carrier of said information storage surface;

a holographic optical element provided integrally with said focusing means, said holographic optical element diffracting the light beam in a return trip reflected from said information storage surface and introducing the diffracted light beam onto a plane substantially flush with a light emitting surface of said coherent light source:

a polarization separating means for receiving the light beam in the return trip which has been diffracted by said holographic optical element and separating said light beam in the return trip into the primary beam and the subsidiary beam through polarization separation;

an optical detecting means provided on the plane substantially flush with the light emitting surface of said coherent light source, said optical detecting means individually detecting respective intensities of the primary beam and subsidiary beam emitted from said polarization separating means and outputting a light intensity signal; and a calculating means for calculating, based on the light intensity signal outputted from said optical detecting means, a super-resolution scanning signal and outputting it.

* * * * *